United States Patent
Fu et al.

(10) Patent No.: US 10,600,193 B2
(45) Date of Patent: Mar. 24, 2020

(54) THREE-DIMENSIONAL MEASUREMENT APPARATUS, THREE-DIMENSIONAL MEASUREMENT METHOD AND PROGRAM

(71) Applicant: OMRON Corporation, Kyoto-shi, Kyoto (JP)

(72) Inventors: Xingdou Fu, Kizugawa (JP); Masaki Suwa, Kyoto (JP)

(73) Assignee: OMRON Corporation, Kyoto-shi (JP)

( * ) Notice: Subject to any disclaimer, the term of this patent is extended or adjusted under 35 U.S.C. 154(b) by 18 days.

(21) Appl. No.: 16/166,213

(22) Filed: Oct. 22, 2018

(65) Prior Publication Data

US 2019/0130589 A1  May 2, 2019

(30) Foreign Application Priority Data

Nov. 1, 2017  (JP) ................. 2017-211840

(51) Int. Cl.
G06T 7/521 (2017.01)
G06T 7/73 (2017.01)
G06T 7/593 (2017.01)
G01B 11/25 (2006.01)

(52) U.S. Cl.
CPC .......... *G06T 7/521* (2017.01); *G01B 11/2513* (2013.01); *G01B 11/2545* (2013.01); *G06T 7/593* (2017.01); *G06T 7/74* (2017.01)

(58) Field of Classification Search
CPC .. G01B 11/2545; G06T 7/593; H04N 13/0239
See application file for complete search history.

(56) References Cited

U.S. PATENT DOCUMENTS

| 6,421,629 B1* | 7/2002 | Ishiyama | G01B 11/255 |
| | | | 702/159 |
| 9,332,244 B2* | 5/2016 | Tsuyuki | H04N 13/204 |
| 2014/0078264 A1* | 3/2014 | Zhang | G01B 11/2513 |
| | | | 348/47 |
| 2019/0130589 A1* | 5/2019 | Fu | G06T 7/74 |

FOREIGN PATENT DOCUMENTS

| WO | 2011033186 A1 | 3/2011 |
| WO | 2016087915 A2 | 6/2016 |

OTHER PUBLICATIONS

NPL Internet Search log; 2019. (Year: 2019).*
Pattern projection for dense and accurate 3D reconstruction in structured light; 2012. (Year: 2012).*
An absolute depth range measurement of 3-D objects based on modulation; 2000. (Year: 2000).*
Filters for 3-D Shape Measurement Using Structured Light; Hobson; 1997. (Year: 1997).*

(Continued)

*Primary Examiner* — Luis Perez-Fuentes
(74) *Attorney, Agent, or Firm* — Metrolex IP Law Group, PLLC

(57) ABSTRACT

Three-dimensional measurement is performed by projecting patterned light having a hybrid pattern Ph onto a measurement target. The hybrid pattern Ph is a pattern in which a random pattern Pr is superimposed on a structured light pattern Ps, and is arranged in pattern such that the random pattern Pr and the structured light pattern Ps do not interfere mutually.

14 Claims, 16 Drawing Sheets

(56) References Cited

OTHER PUBLICATIONS

European search report dated Mar. 20, 2019 in a counterpart European Patent Application.
P. Vuylsteke and A. Oosterlinck, "Range Image Acquisition with a Single Binary-Encoded Light Pattern", IEEE Transactions on Pattern Analysis and Machine Intelligence, Feb. 1990, p. 148-164, vol. 12, No. 2; Concise explanation of relevance provided in the specification.

* cited by examiner

FOUR TYPES OF PRIMITIVES

RECTANGULAR AREAS SET IN PRIMITIVE

FIG. 9A EXAMPLE OF "WORD" (4 × 4 PRIMITIVES)
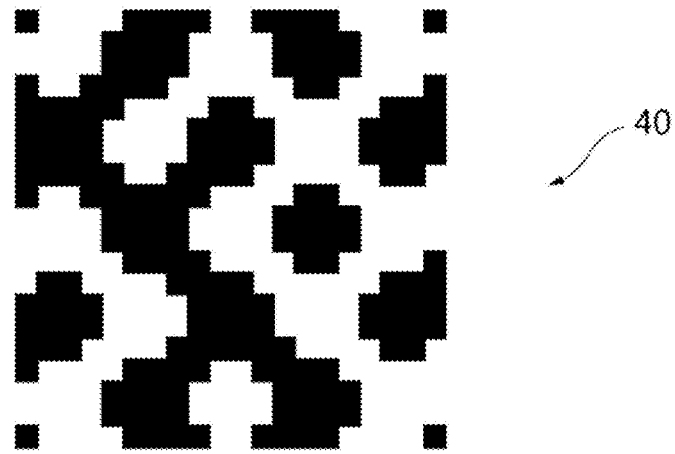
FIG. 9B PRIMITIVES INCLUDED IN "WORD" (PORTION)
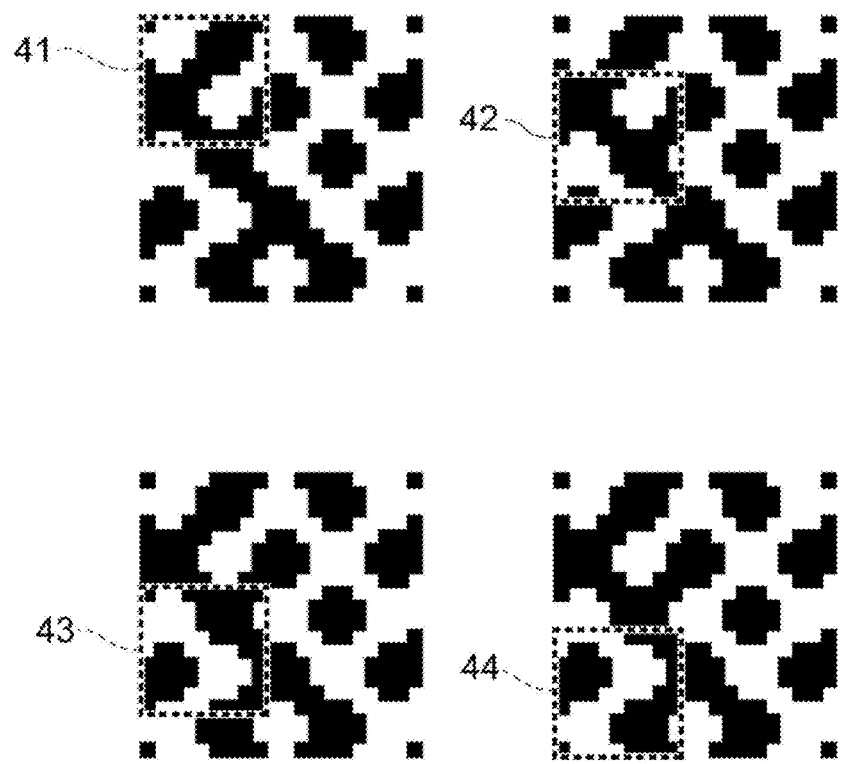

THREE-DIMENSIONAL MEASUREMENT APPARATUS, THREE-DIMENSIONAL MEASUREMENT METHOD AND PROGRAM

CROSS-REFERENCES TO RELATED APPLICATIONS

This application claims priority to Japanese Patent Application No. 2017-211840 filed Nov. 1, 2017, the entire contents of which are incorporated herein by reference.

FIELD

The disclosure relates to a three-dimensional measurement technology for measuring a three-dimensional position of a measurement target by projecting patterned light.

BACKGROUND

As a technique for measuring a three-dimensional shape of a measurement target, active measurements are known. In active measurements, a measurement target is captured in a state where patterned light is projected onto it, and the three-dimensional shape (three-dimensional position of each pixel) of the measurement target is acquired from the position of the pattern on the captured image using the principle of triangulation.

One-shot active shape measurement, which can measure a three-dimensional shape with only one image, uses only one image and can perform real-time measurement, and for this reason and others, it has attracted attention as a useful technique in active measurements.

As a method for performing one-shot active shape measurement, a method using a structured light pattern has been known. In the method using a structured light pattern, a measurement target is captured in a state where patterned light is projected onto it, and the three-dimensional shape of the measurement target is acquired from the position of the pattern on the captured image. The method using a structured light pattern has advantages such as high accuracy (at a short distance, in particular), a wide view angle, and a lower cost.

As one example of the methods using a structured light pattern, Non-Patent Document 1 discloses a method using patterned light that is spatially coded. The two-dimensional pattern disclosed in Non-Patent Document 1 has a structure in which pattern constitution elements called "primitive" are two-dimensionally laid out. A window including multiple primitives (e.g., a window that is constituted by 2×3 primitives) can be specified from the multiple primitives included in the window. Accordingly, the three-dimensional position can be calculated by detecting the row of the primitives from the captured image.

On the other hand, as passive measurement, a method for acquiring the three-dimensional shape of a measurement target using two cameras (a so-called stereo camera) is known. In the method using a stereo camera, a method (three-dimensional measurement method using a stereo method) is used, in which a measurement target is captured simultaneously by cameras arranged on the left and right, a corresponding pair of pixels, that is corresponding points, are searched in the acquired images, how far the corresponding points of the left and right images are separated each other in the left-right direction (that is, parallax) is determined, and the three-dimensional position of each of the pixels in the captured images is calculated by applying the principle of triangulation to this parallax.

However, in three-dimensional measurement using a stereo method, the measurement accuracy is directly affected by the surface texture of the measurement target, and thus it is very difficult to detect the corresponding points and calculate the three-dimensional positions for flat surfaces and reflective surfaces with little texture.

To solve such a problem and improve the accuracy of the detection of corresponding points and the calculation of three-dimensional positions, a method has been proposed, in which a stereo camera and one projector is used, patterned light is projected from the projector, a texture is given to the surface of a measurement target, and template matching is performed.

"P. Vuylsteke and A. Oosterlinck, Range Image Acquisition with a Single Binary-Encoded Light Pattern, IEEE PAMI 12(2), pp. 148-164, 1990" is an example of background art (referred to as Non-Patent Document 1 above).

SUMMARY

However, in the method using a structured light pattern disclosed in Non-Patent Document 1, patterned light having a coded pattern is projected onto a measurement target, and thus, if the measurement target is small, it is difficult to accurately decode the code of the patterned light shown in the captured image of the measurement target. Accordingly, there is the problem that the reconstruction ability of the point group (hereinafter, also referred to as "three-dimensional point group data") is low, the point group restoring the three-dimensional shape of the measurement target.

On the other hand, with the method using a stereo camera, the texture that is obtained by projecting patterned light is used for searching corresponding points, and thus processing such as decoding the code of the patterned light is not needed. Accordingly, even if a measurement target is small, the reconstruction ability of the three-dimensional point group data using a stereo camera is higher than the reconstruction ability of the three-dimensional point group data using a structured light pattern.

However, with the method using a stereo camera, the accuracy of the three-dimensional point group data is low, and thus the obtained image is unclear. FIG. 14 is a drawing in which the clarity of an image captured using a stereo camera and the clarity of an image captured using a structured light pattern are compared.

As shown in FIG. 14, because the accuracy of the three-dimensional point group data obtained using a stereo camera is lower than that obtained using a structured light pattern, the clarity of the image is lower than that of the image obtained using a structured light pattern.

One or more aspects have been made in light of the above-mentioned circumstances, and may provide a three-dimensional measurement technology whose reconstruction ability of three-dimensional point group data and clarity of an image of a measurement target are higher than those of conventional technologies.

A three-dimensional measurement apparatus according to one aspect is a three-dimensional measurement apparatus for measuring a three-dimensional shape of a measurement target. The apparatus includes: a projector projecting, onto a measurement target, patterned light having a hybrid pattern in which a two-dimensionally coded pattern, in which a plurality of types of words distinguishable from each other are two-dimensionally arranged, and a random pattern, in which a plurality of random pieces each uniquely identifiable are irregularly arranged, are arranged so as not to cause mutual interference of these patterns, an image capturing unit including a first camera and a second camera capturing a plurality of images of the measurement target onto which the patterned light is projected, a memory (such as a random access memory, (RAM), read-only memory (ROM), Hard Drive Disk (HDD), etc.) storing the two-dimensionally coded pattern, a processor (such as central processing unit (CPU), application specific integrated circuit (ASIC), etc.) configured with a program to perform operations as units of the three-dimension measurement apparatus, a first calculation unit configured to select target pixels from a captured image that is captured by the first camera or the second camera, extract, for each of the selected target pixels, the word of the patterned light that is projected onto that pixel, and acquire a three-dimensional position of each of the target pixels based on the extracted word and the two-dimensionally coded pattern stored in the memory, and a second calculation unit configured to, in response to one of the captured images that are captured by the first camera and the second camera being regarded as a reference image and the other captured image being regarded as a comparison image, extract feature points respectively corresponding to the random pieces from the reference image, perform a stereo matching with respect to the comparison image using each of the extracted feature points, and determine a three-dimensional position of each of the feature points based on a stereo matching result.

With the above configuration, three-dimensional measurement is performed by projecting patterned light having a hybrid pattern onto a measurement target. Here, the hybrid pattern is a pattern in which the random pattern is superimposed on the two-dimensionally coded pattern (that is, structured light pattern) in which a plurality of types of words distinguishable from each other are two-dimensionally arranged, and is arranged in pattern such that the random pattern and the structured light pattern do not interfere mutually. In this manner, both advantages of the structured light pattern and the random pattern can be obtained. That is, it is possible to obtain both advantages of the structured light pattern that is excellent in the image clarity and the random pattern that is excellent in the reconstruction ability of the three-dimensional point group data.

A three-dimensional measurement method according to another aspect is a three-dimensional measurement method for measuring a three-dimensional shape of a measurement target. The method includes: projecting, onto a measurement target, patterned light having a hybrid pattern in which a two-dimensionally coded pattern, in which a plurality of types of words distinguishable from each other are two-dimensionally arranged, and a random pattern, in which a plurality of random pieces each uniquely identifiable are irregularly arranged, are arranged so as not to cause mutual interference of these patterns, capturing the measurement target onto which the patterned light is projected using an image capturing unit including a first camera and a second camera, selecting target pixels from a captured image that is captured by the first camera or the second camera, extracting, for each of the selected target pixels, the word of the patterned light that is projected onto that pixel, and determining a three-dimensional position of each of the target pixels based on the extracted word and a two-dimensionally coded pattern stored in a memory (such as a random access memory, (RAM), read-only memory (ROM), Hard Drive Disk (HDD), etc.), and, in response to one of the captured images that are captured by the first camera and the second camera being regarded as a reference image and the other captured image being regarded as a comparison image, extracting feature points respectively corresponding to the random pieces from the reference image, performing stereo matching with respect to the comparison image using each of the extracted feature points, and determining a three-dimensional position of each of the feature points based on a stereo matching result.

A program according to another aspect is a program for causing a computer, which includes a memory (such as a random access memory, (RAM), read-only memory (ROM), Hard Drive Disk (HDD), etc.) storing a two-dimensionally coded pattern and an image capturing unit including a first camera and a second camera, to measure a three-dimensional shape of a measurement target. The program causes the computer to execute operations comprising: projecting, onto a measurement target, patterned light having a hybrid pattern in which a two-dimensionally coded pattern, in which a plurality of types of words distinguishable from each other are two-dimensionally arranged, and a random pattern, in which a plurality of random pieces each uniquely identifiable are irregularly arranged, are arranged so as not to cause mutual interference of these patterns, capturing the measurement target onto which the patterned light is projected using an image capturing unit, selecting target pixels from captured images that are captured by the first camera or the second camera, extracting, for each of the selected target pixels, the word of the patterned light that is projected onto that pixel, and determining a three-dimensional position of each of the target pixels based on the extracted word and a two-dimensionally coded pattern stored in the memory, and, in response to one of the captured images that are captured by the first camera and the second camera being regarded as a reference image and the other captured image being regarded as a comparison image, extracting feature points respectively corresponding to the random pieces from the reference image, performing stereo matching with respect to the comparison image using each of the extracted feature points, and determining a three-dimensional position of each of the feature points based on a stereo matching result.

With one or more aspects, it is possible to provide a three-dimensional measurement technology whose reconstruction ability of three-dimensional point group data and image clarity of a measurement target are higher than those of conventional technologies.

BRIEF DESCRIPTION OF THE DRAWINGS

FIGS. 9A and 9B are diagrams illustrating a word constituted by multiple primitives.

DETAILED DESCRIPTION

Hereinafter, an embodiment will be described in detail with reference to the drawings. A three-dimensional measurement system according to an embodiment captures a measurement target by patterned light being projected onto it, and measures the three-dimensional shape of the measurement target using the principle of triangulation. Note, that the same reference signs are given to elements that are the same, and redundant description is omitted. Also, the following embodiments are examples for illustrating the present invention, and it is not intended to limit the present invention only to the embodiment thereof. Furthermore, various modifications can be made to the present invention without departing from the gist thereof.

A. An Embodiment

[Configuration]

Figure 1:
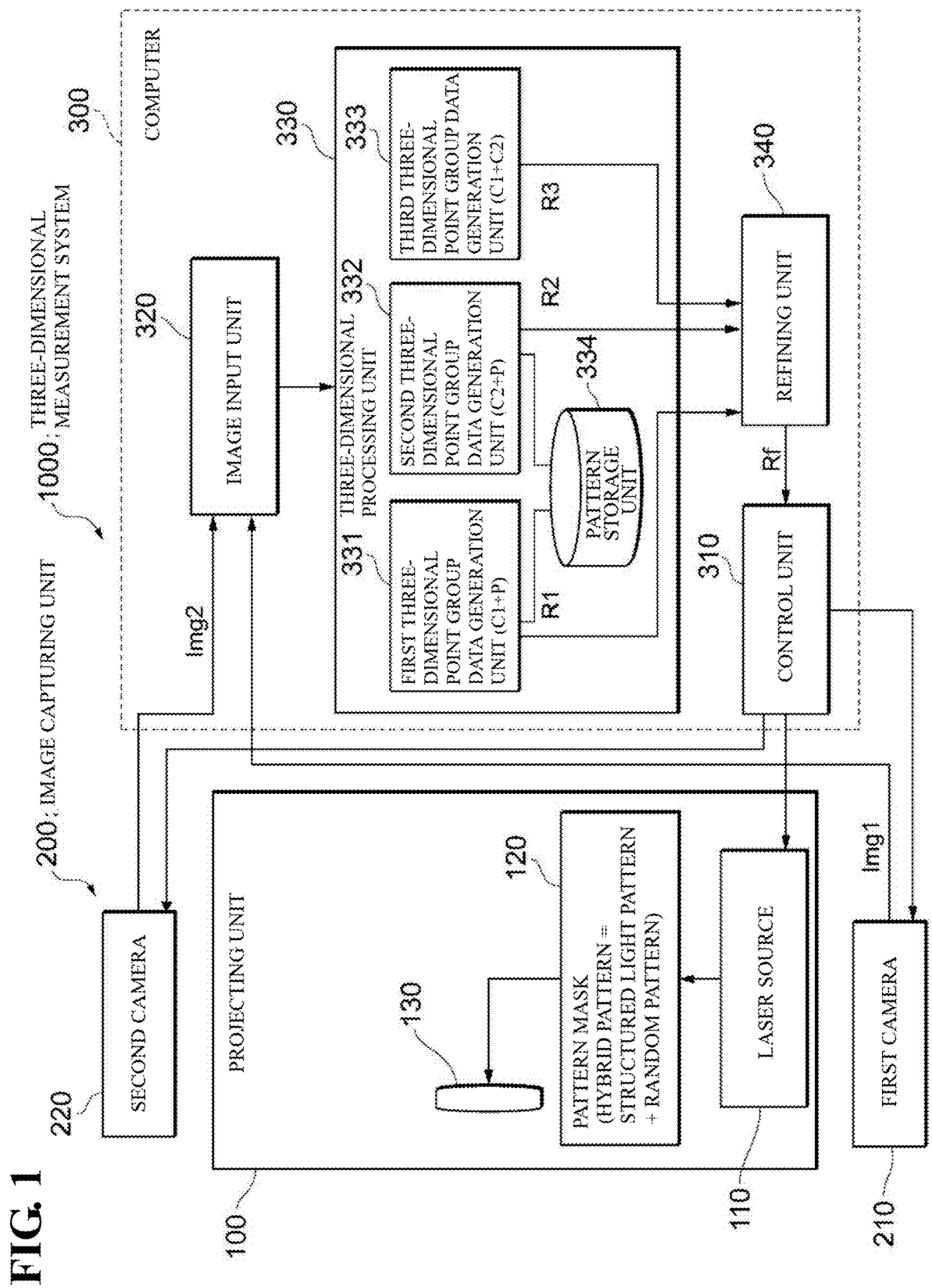
FIG. 1 is a diagram illustrating an overall configuration of a three-dimensional measurement system.

FIG. 1 is a diagram showing a configuration of a three-dimensional measurement system 100 according to an embodiment.

The three-dimensional measurement system 1000 is configured to include a projecting unit 100, an image capturing unit 200, and a computer 300. The three-dimensional measurement system 1000 according to an embodiment is a hybrid three-dimensional measurement system in which a system for acquiring a three-dimensional position of a measurement target using a structured light pattern (hereinafter, also referred to as "structured light system") and a system for acquiring the three-dimensional position of the measurement target using a stereo camera (hereinafter, also referred to as "stereo camera system") are merged.

The projecting unit 100 is an apparatus for projecting patterned light having a hybrid pattern that is characteristic for an embodiment. The projecting unit 100 includes a laser source 110, a pattern mask 120, and a lens 130. The light emitted from the laser source 110 is converted into patterned light having a hybrid pattern through the pattern mask 120, and is projected to the outside through the lens 130.

The laser source 110 includes, for example, an LED module constituted by multiple LEDs. The wavelength of the laser light generated by the laser source 110 is not particularly limited, and light such as infrared light, visible light, and ultraviolet light can be used.

Figure 2:
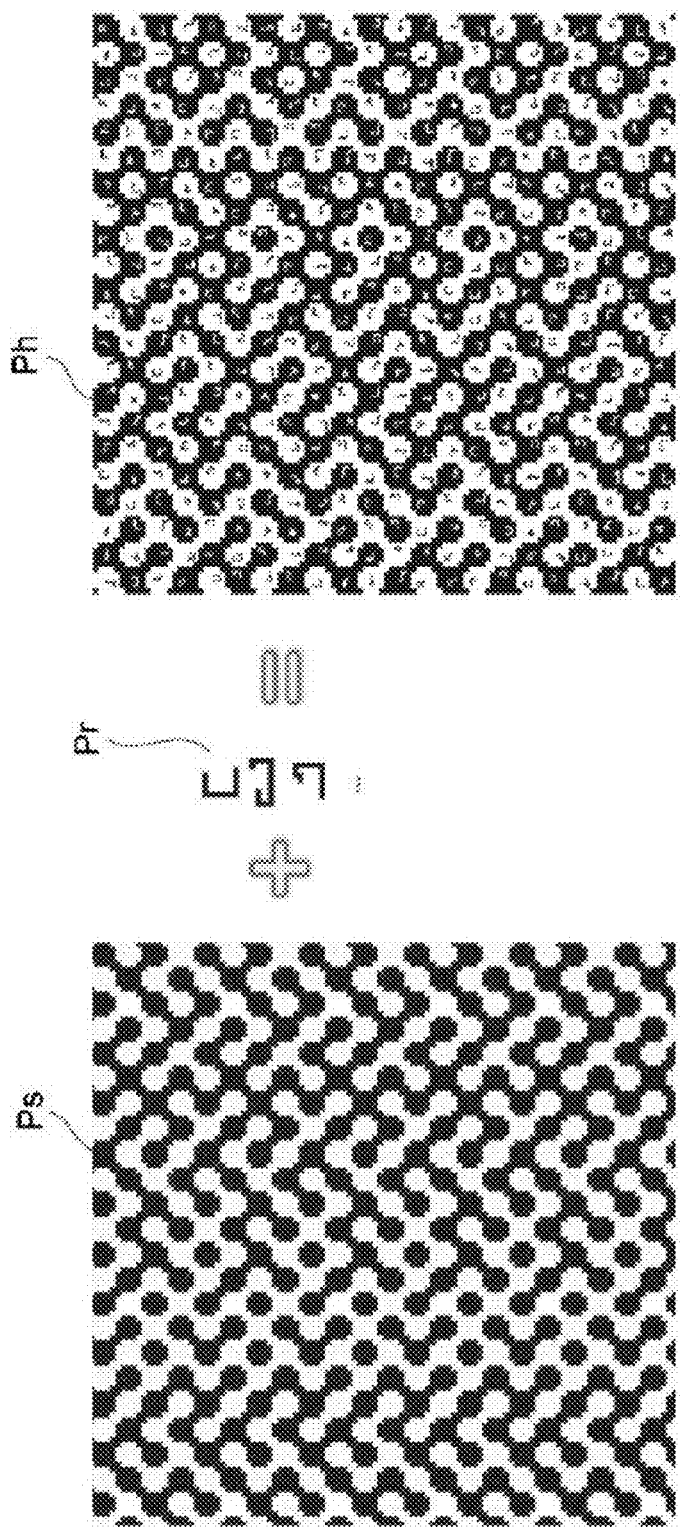
FIG. 2 is a diagram illustrating a hybrid pattern.

In the pattern mask 120, a hybrid pattern is formed by combining a structured light pattern and a random pattern. An example of a hybrid pattern Ph is shown in FIG. 2. Naturally, instead of forming the hybrid pattern Ph using the pattern mask 120, a method is also possible, in which a pattern is divided into two patterns of a structured light pattern and a random pattern, and a hybrid pattern is formed by individually projecting the respective patterned light onto a measurement target. Note, that the role and the like of a structured light pattern Ps and a random pattern Pr will be described in detail later and their description will be continued.

Here, the projecting unit 100 is not limited to the above configuration, and an ordinary projector may also be used. In this case, for example, the pattern mask 120 that forms the hybrid pattern may be stored in the projector.

The image capturing unit 200 captures an object (measurement target) onto which the patterned light that is projected from the projecting unit 100 is projected, and is configured to include a first camera 210 and a second camera 220. The first camera 210 and the second camera 220 are camera modules constituted by an image sensor, a lens, a lens driving element, and so on. A CMOS sensor, a CCD sensor or the like is used as the image sensor, and an image sensor that can detect the wavelength of the patterned light that is projected from the projecting unit 100 is selected.

Figure 3:
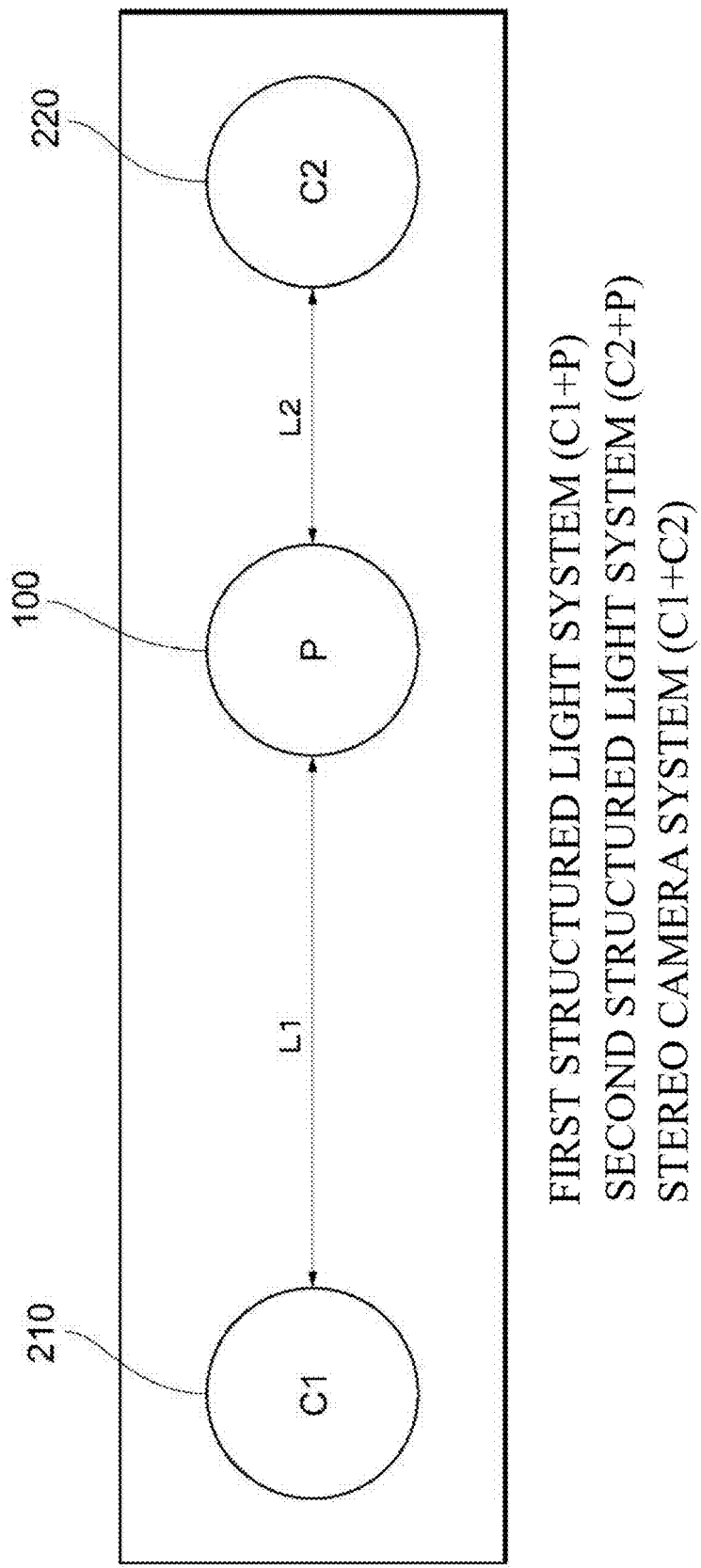
FIG. 3 is a diagram illustrating a positional relationship between a projecting unit and an image capturing unit.

The pixel size and the installation position of the first camera 210 and the second camera 220 are appropriately selected and set, based on the size of the measurement target and the required measurement accuracy. FIG. 3 is a diagram illustrating a positional relationship between the projecting unit 100, the first camera 210, and the second camera 220.

As shown in FIG. 3, the projecting unit (P) 100 is installed between the first camera (C1) 210 and the second camera (C2) 220. With such a configuration, two structured light systems for viewing the measurement target from different visual directions, and one stereo camera system are formed. That is, a first structured light system (C1+P) is formed with the projecting unit 100 and the first camera 210, a second structured light system (C2+P) is formed with the projecting unit 100 and the second camera 220, and a stereo camera system (C1+C2) is formed with the first camera 210 and the second camera 220. In the example shown in FIG. 3, the distance L1 (first base line) between the first camera 210 and the projecting unit 100 is set to be longer than the distance L2 (second base line) between the second camera 220 and the projecting unit 100. Note, that the first base line L1 and the second base line L2 may also have the same length. Also, the arrangement of the first camera 210, the second camera 220, and the projecting unit 100 may also be exchanged. Furthermore, a configuration is also possible in which one 2D camera is added for capturing only visible light, whereas only invisible light that is emitted from the projecting unit 100 is captured by the first camera (C1) 210 and the second camera (C2) 220.

The computer 300 is configured as a general purpose computer (information processing device) including a processor such as a CPU (Central Processing Unit), a main storage device such as a RAM and a ROM used as a work memory, an auxiliary storage device such as a hard disk, input devices such as a keyboard, pointing devices (e.g., a mouse, a touch pad, and a touch panel) and a mike, output devices such as a display device (e.g., liquid crystal display) and a speaker, and communication devices for performing wired communications and wireless communications. The computer 300 executes various processing by the processor loading a computer program stored in the auxiliary storage device or the like. Such a program is provided by being stored in a computer readable storage medium such as a memory card and an optical disk, or is provided via the Internet or the like. Note, that the program according to an embodiment may also be provided as a single application program, or may also be provided as a module that is incorporated into a portion of another program. Also, some or all of the processing executed by the program may also be executed by a dedicated circuit such as an ASIC.

The computer 300 operates as a control unit 310, an image input unit 320, a three-dimensional processing unit 330, and a refining unit 340, by the processor loading and executing the program stored in the auxiliary storage device or the like.

The control unit 310 centrally controls the entire three-dimensional measurement system 1000, and particularly controls, for example, the projection of the patterned light having the hybrid pattern projected from the projecting unit 100, the capture performed by the image capturing unit 200, and the measurement of the three-dimensional position based on the captured image.

The image input unit 320 receives images captured by the first camera 210 and the second camera 220, and stores the images as captured images. Note, that the control unit 310 transmits a synchronous signal from a timing control circuit (not shown) to the first camera 210 and the second camera 220 such that the capturing timings by the first camera 210 and the second camera 220 are coincident (that is, synchronized with each other). For convenience of description, hereinafter, an image captured by the first camera 210 is called "first captured image Img1", and an image captured by the second camera 220 is called "second captured image Img2".

The three-dimensional processing unit 330 includes a first three-dimensional point group data generation unit 331, a second three-dimensional point group data generation unit 332, a third three-dimensional point group data generation unit 333, and a pattern storage unit 334. The three-dimensional processing unit 330 generates three types of three-dimensional point group data shown in the following (1) to (3), based on the first captured image Img1 and the second captured image Img2 that are supplied from the image input unit 320. Note, that (1) and (2) are modes for generating the three-dimensional point group data using the structured light pattern Ps, and (3) is a mode for generating the three-dimensional point group data using the random pattern Pr. In an embodiment, a merged mode is assumed, in which the three-dimensional point group data is generated using all of the following (1) to (3) at the same time. However, the three-dimensional point group data may also be generated using only the structured light pattern Ps, or using only the random pattern Pr.

(1) The first three-dimensional point group data generation unit 331 generates three-dimensional point group data R1 based on the first captured image Img1, by using the first structured light system (C1+P) constituted by the projecting unit 100 and the first camera 210.

(2) The second three-dimensional point group data generation unit 332 generates three-dimensional point group data R2 based on the second captured image Img2, by using the second structured light system (C2+P) constituted by the projecting unit 100 and the second camera 220.

(3) The third three-dimensional point group data generation unit 333 generates three-dimensional point group data R3 based on the first captured image Img1 and the second captured image Img2, by using the stereo camera system (C1+C2) constituted by the first camera 210 and the second camera 220.

Note, that the details of the three-dimensional point group data R1 to R3, which are respectively generated by the first three-dimensional point group data generation unit 331 to the third three-dimensional point group data generation unit 333, will be described later.

The refining unit 340 generates final point group data Rf, by refining the three types of three-dimensional point group data R1 to R3 that are supplied from the three-dimensional processing unit 330. The method for refining the three-dimensional point group data includes a method shown in FIG. 4.

Figure 4:
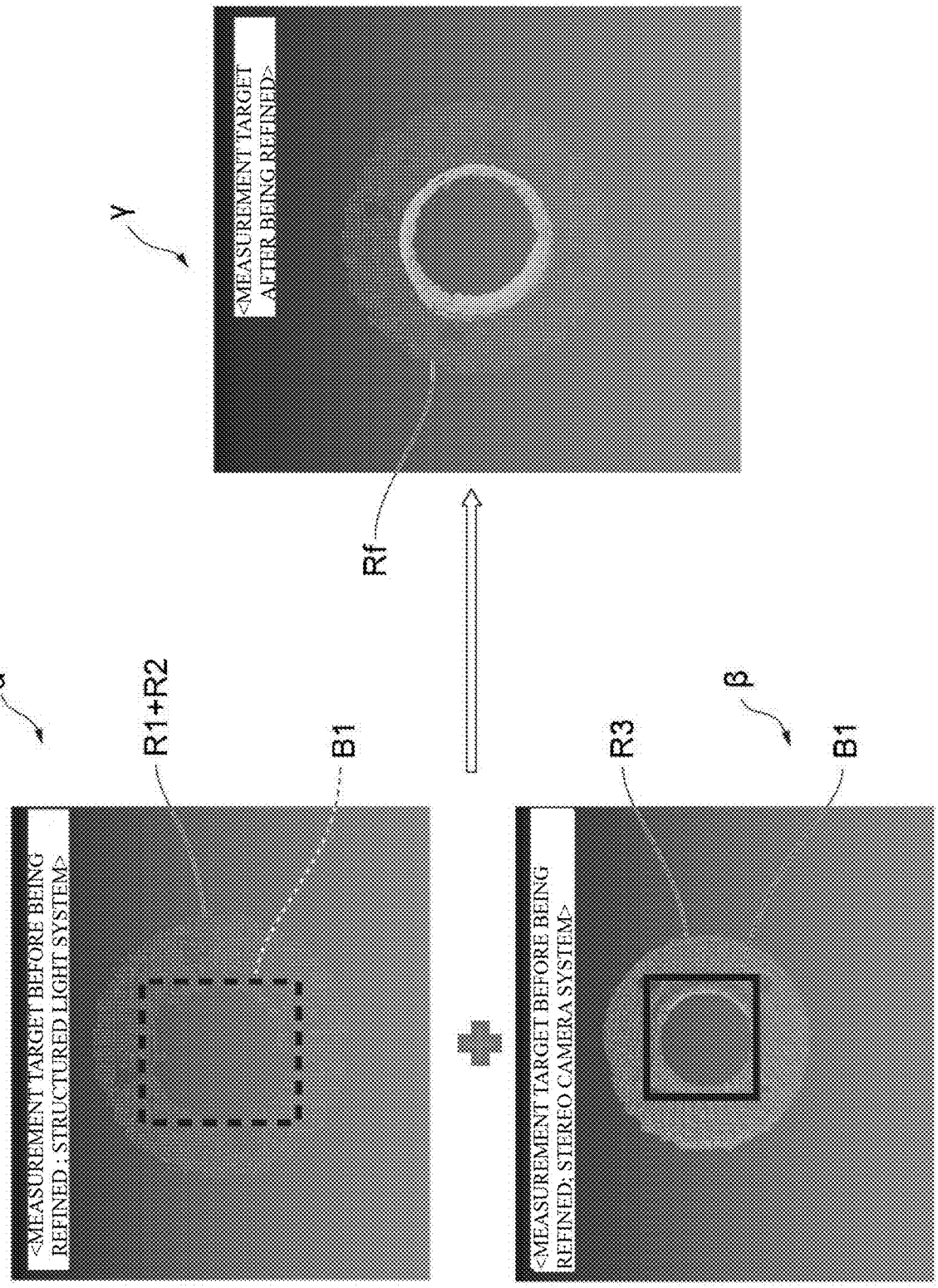
FIG. 4 is a diagram illustrating a method for refining three-dimensional point group data.

Diagram "α" shown in FIG. 4 shows the three-dimensional point group data R1 and R2 of a measurement target W (hollow disk in FIG. 4) before they are refined, which is generated by the first structured light system (C1+P) and the second structured light system (C2+P). Diagram "β" shown in FIG. 4 shows the three-dimensional point group data R3 of the measurement target W before it is refined, which is generated by the stereo camera system (C1+C2). And diagram "γ" shown in FIG. 4 shows the final point group data Rf of the measurement target W after being refined. As mentioned above, if the measurement target W is small, the reconstruction ability (reproducibility) of the three-dimensional point group data obtained using a structured light system becomes low. In the example shown in FIG. 4, the reconstruction ability of the three-dimensional point group data R1 and R2 of the boundary portion B1 at the inner circumference of the measurement target W (see the broken line frame shown by a in FIG. 4) of the three-dimensional point group data R1 and R2 that are generated by a structured light system becomes low. Accordingly, the final point group data Rf of the boundary portion B1 at the inner circumference of the measurement target W is generated, by refining the three-dimensional point group data by superimposing the three-dimensional point group data R3 (see the solid line frame shown by β in FIG. 4) that is obtained using a stereo camera system on the three-dimensional point group data R1 and R2 that are generated by a structured light system. The refining unit 340 stores the generated final point group data Rf in a memory of a three-dimensional map, or outputs the generated final point group data Rf to an external apparatus. Note, that the method shown in FIG. 4 is merely one example for refining three-dimensional point group data, and the method can be appropriately set or changed according to the shape, size, and the like of a measurement target.

Overview of Hybrid Pattern

The hybrid pattern Ph according to an embodiment is obtained by superimposing the random pattern Pr on the structured light pattern Ps (see FIG. 2), and can have both advantages of the structured light pattern Ps and the random pattern Pr. Specifically, the accuracy of the three-dimensional point group data, that is, the clarity of an image in the case of projecting the structured light pattern Ps onto the measurement target is higher than that in the case of projecting the random pattern Pr onto the measurement target, and thus the structured light pattern has an advantage. On the other hand, the reconstruction ability of the three-dimensional point group data to small areas, which is exhibited when the measurement target is small, in the case of projecting the random pattern Pr onto the measurement target W is higher than that in the case of projecting the structured light pattern Ps onto the measurement target W, and thus the random pattern Pr has an advantage. The hybrid pattern Ph is intended to obtain both of these advantages.

Figure 5:
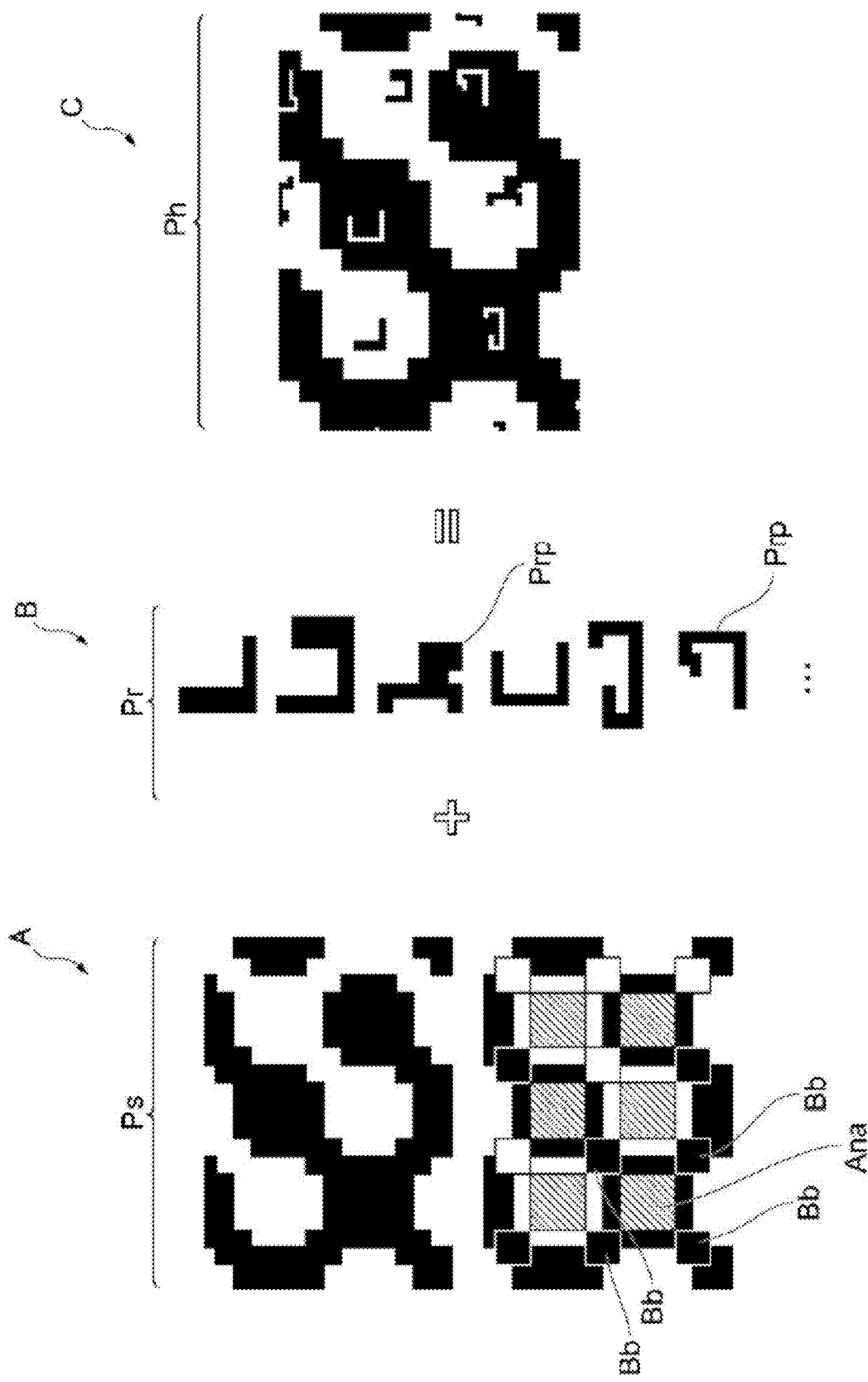
FIG. 5 is a diagram illustrating a generation method of a hybrid pattern.

FIGS. 5A to 5C are diagrams for illustrating a method for generating the hybrid pattern Ph. FIG. 5A is a pattern diagram in which a portion of the structured light pattern Ps constituting the hybrid pattern Ph is enlarged. FIG. 5B is a diagram showing random pieces Prp that are portions of the random pattern Pr constituting the hybrid pattern Ph. FIG. 5C is a pattern diagram in which a portion of the hybrid pattern Ph, which is generated by superimposing the random pattern Pr on the structured light pattern Ps, is enlarged. In FIG. 5, the black portion of the pattern shows that light is illuminated, and the white portion of the pattern shows that light is not illuminated, but this may also be reversed.

In an embodiment, the hybrid pattern Ph is generated (see FIG. 5C), by superimposing the random pieces Prp constituting the random pattern Pr (see FIG. 5B) on rectangular areas Ana (see FIG. 5A) positioned so as not to overlap bounding boxes Bb (corresponding to later-mentioned "bits") constituting the structured light pattern Ps.

Here, the size of the random pieces Prp is always set to be smaller than the size of the rectangular area Ana of the structured light pattern. By superimposing the random pieces Prp each having such a size on the rectangular areas Ana positioned so as not to overlap the bounding boxes Bb, interference between the random pattern Pr constituted by the random pieces Prp and the structured light pattern Ps (that is, mutual interference between patterns) is prevented (e.g. the random pattern does not affect image processing of the structured light pattern and the structured light pattern does not affect image processing of the random pattern). For preventing such an interference, it is preferable that the random pieces Prp are superimposed on regions within the rectangular area Ana, but the random piece Prp may also be superimposed on a region other than the rectangular area Ana, within a range in which the influence on the detection of the feature points of the structured light pattern is small.

Note, that as shown in FIG. 5, an appropriate combination of dots, lines, curves, and the like is used for the random piece Prp. In addition, one of the random pieces Prp, which are unique and different from each other, is superimposed on each rectangular area Ana. In this manner, each of the random pieces Prp can be uniquely specified. Also, the random pieces Prp and the rectangular areas Ana on which the random pieces Prp are superimposed are set to be inverted in black and white with each other. For example, if a random piece Prp is superimposed on a black rectangular area Ana, the superimposed random piece Prp is set to white. On the other hand, if a random piece Prp is superimposed on a white rectangular area Ana, the superimposed random piece Prp is set to black (see FIG. 5C).

Figure 6:
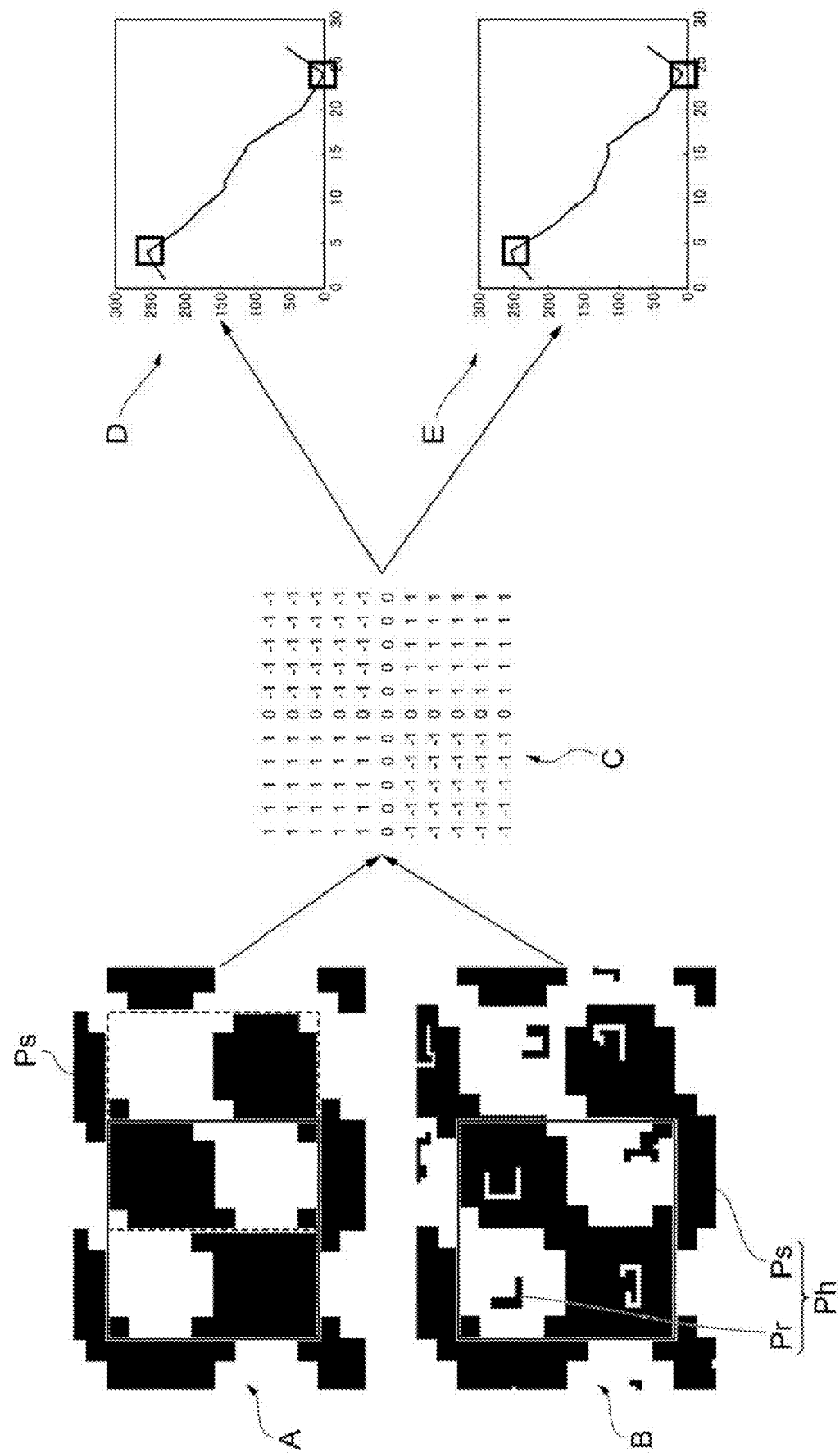
FIG. 6 is a diagram illustrating an influence of superimposition of a random pattern on a structured light pattern.

FIG. 6 is a diagram illustrating the influence of superimposition of the random pattern Pr on the structured light pattern Ps. FIG. 6A shows the structured light pattern Ps, and FIG. 6B shows the hybrid pattern Ph in which the random pattern Pr is superimposed on the structured light pattern Ps. Note that, in FIG. 6A, a target region to be filtered is shown by solid lines, and a target region shifted by a predetermined amount (e.g., by 20 pixels) is shown by broken lines. In FIG. 6B, the target region to be filtered is shown by solid lines.

FIG. 6C shows an example of a filter using a two-dimensional convolution matrix. Here, FIG. 6D shows the change in a convolution operation result (convolution value) of the target region of the structured light pattern Ps after filtering when the filter shown in FIG. 6C has been shifted pixel by pixel to the right. On the other hand, FIG. 6E shows the change in a convolution operation result (convolution value) of the target region of the hybrid pattern Ph after filtering when the filter shown in FIG. 6C has been similarly shifted pixel by pixel to the right. In FIGS. 6D and 6E, the peak value (maximum value) and the valley value (minimum value) in the convolution operation result are enclosed in a square.

Here, the convolution operation result when the target region to be filtered shown in FIG. 6A is the region shown by solid lines is the peak value shown in FIG. 6D. In this state, if the filter shown in FIG. 6C is shifted pixel by pixel to the right, the convolution operation result decreases as shown in FIG. 6D. If the filter has been finally shifted to the right by 20 pixels, the target region of filtering shown in FIG. 6A is the region shown by broken lines. The convolution operation result at this time is the valley value shown in FIG. 6D. As mentioned above, if the target region to be filtered shifts, the peak value of the convolution operation result of the target region after filtering decreases, and the valley value increases. As a result, the relationship between the peak value and the valley value is significantly broken, which greatly affects the detection of feature points that are extracted from a captured image of a measurement target.

On the other hand, if the random pattern Pr is superimposed on the structured light pattern Ps while the target region to be filtered remains unchanged, as it is clear by comparing FIGS. 6D and 6E, although there are some changes in the convolution operation result of the target region, the relationship between the peak value and the valley value of the convolution operation result is not significantly broken. Accordingly, even if the random pattern Pr is superimposed on the structured light pattern Ps, there is almost no influence on the detection of the feature points as compared with the case of using only the structured light pattern Ps.

To confirm that the influence of superimposition of the random pattern Pr on the structured light pattern Ps is small, the present inventors prepared, in addition to the hybrid pattern Ph according to an embodiment (that is, the hybrid pattern Ph in which the random pattern Pr was superimposed on the structured light pattern Ps), a structured light pattern Ps in which the random pattern was not superimposed for comparison. Then, the present inventors acquired the average positional shift amount between the calculated target pixels shown in an image captured when the patterned light having the hybrid pattern Ph was projected and the calculated target pixels shown in an image captured when the patterned light having the pattern for comparison was projected. As a result, the average positional shift amount was very small, namely approximately 0.033 pixel. Therefore, it was confirmed that the influence of the superimposition of the random pattern Pr is very small in the three-dimensional measurement using the structured light pattern Ps.

<Explanation of Structured Light Pattern Ps>

Figure 7A:
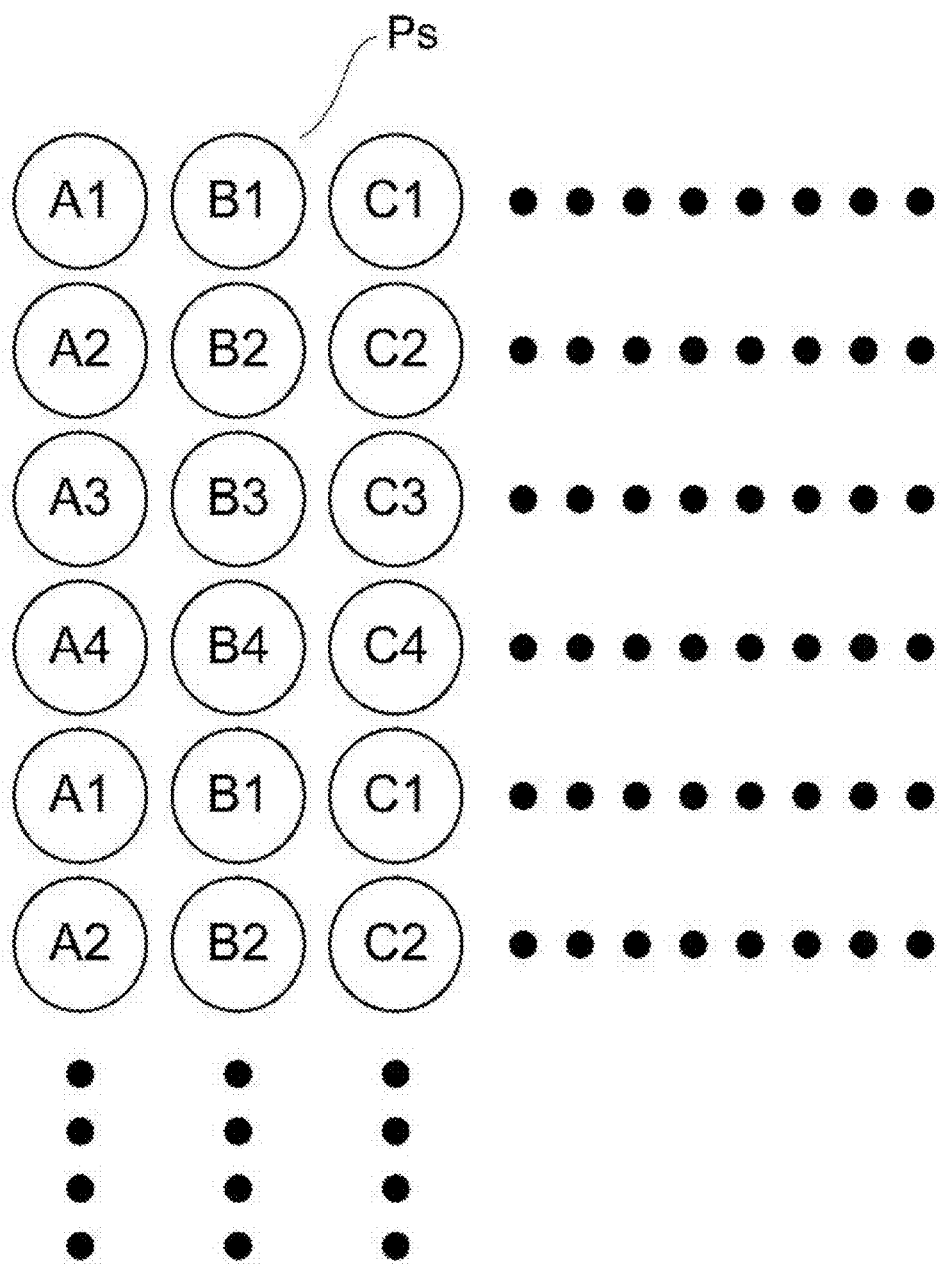
FIG. 7A is a diagram illustrating a structured light pattern.

The structured light pattern Ps is subjected to predetermined encoding, and can be considered as a two-dimensional array of codes as shown in FIG. 7A. The structured light pattern Ps has a code string peculiar to each column. Accordingly, the three-dimensional processing unit 330 of the computer 300 can acquire the three-dimensional position of each pixel, by analyzing the captured image of the measurement target onto which the patterned light is projected and determining to which column of the structured light pattern Ps the target pixel in the captured image corresponds. More specifically, the pixels are processed in units of primitives, which will be explained later.

Figure 7B:
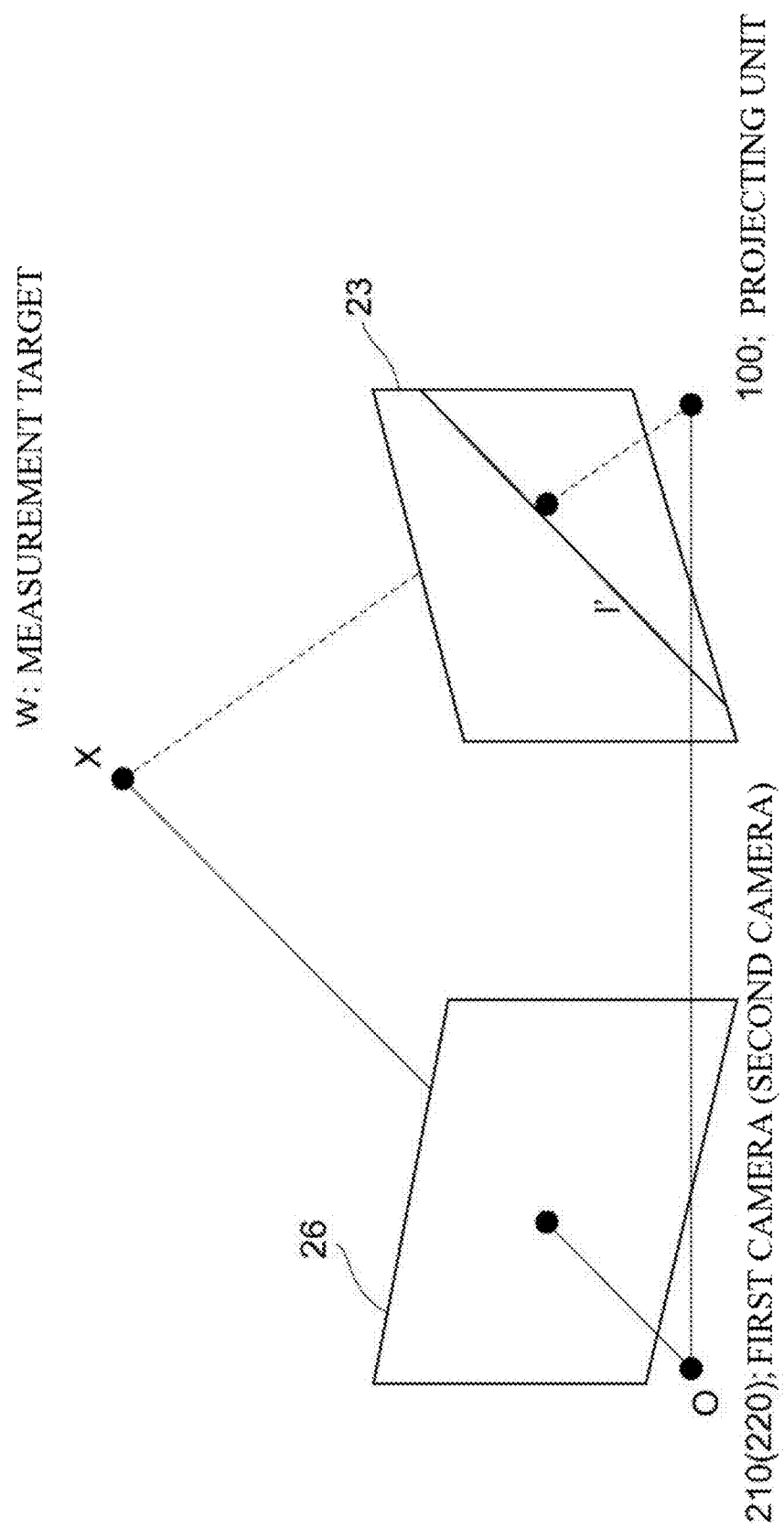
FIG. 7B is a diagram illustrating a principle of a three-dimensional measurement using a structured light pattern.

FIG. 7B is a diagram illustrating the principle of the three-dimensional measurement using the structured light pattern Ps according to an embodiment. FIG. 7B shows that patterned light 23 having a structured light pattern is projected onto the measurement target W from the projecting unit 100, and the measurement target W onto which the patterned light is projected is captured by the first camera 210 (or the second camera 220). Here, the points on the straight line OX that connects the position O of the first camera 210 (or the second camera 220) and the point X of the measurement target W form a straight line on the image plane of the projecting unit 100. This straight line is called as an epipolar line l' of a target pixel x in a captured image 26. The corresponding point of the patterned light with respect to the target pixel x (in other words, the patterned light of which column is projected onto the target pixel x)

can be determined by searching the epipolar line l'. The three-dimensional position of the point X of the measurement target W can be acquired by recognizing the corresponding point of the target pixel x by searching the epipolar line l', and applying the principle of triangulation to the recognized corresponding point of the target pixel x.

The patterned light of the structured light pattern according to an embodiment has a two-dimensionally coded pattern. Specifically, the patterned light has "words" in which a predetermined number of finite types of "primitives" (basic patterns) constituted by light and dark binary values are two-dimensionally arranged. Each type of "words" has a different two-dimensional structure, and the "words" are distinguishable from each other.

Figure 8A:
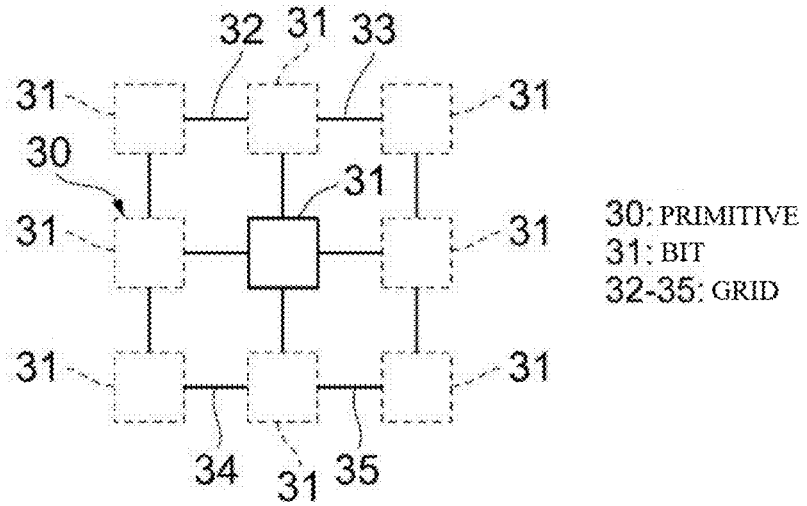
FIGS. 8A to 8E are diagrams illustrating a primitive.

FIG. 8A is a diagram illustrating the "primitives". A primitive 30 is constituted by a "bit" 31 that is one small rectangle and is positioned in the center, and "grids" 31 to 35 that are four large rectangles and are arranged surroundings the "bit" 31. One primitive has four possible values as shown in FIG. 8D, depending on a combination of the presence or absence of light irradiation of the bit and the grids. Note that, in FIG. 8A, one bit 31 arranged at the center is shown by a solid line, but the bit 31 exists not only at the center but also at its surroundings as shown by broken lines.

Figure 8B:
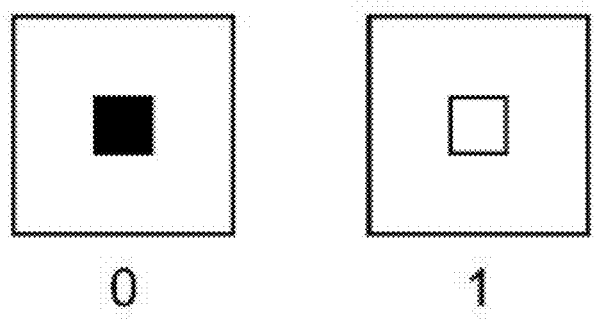

First, as shown in FIG. 8B, the value (absolute value) of the primitive is decided to "0" or "1", depending on the presence or absence of light irradiation to the bit 31.

Figure 8C:
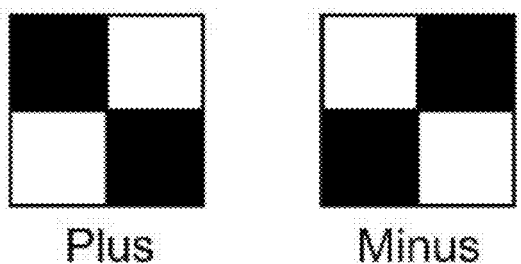
Figure 8D:
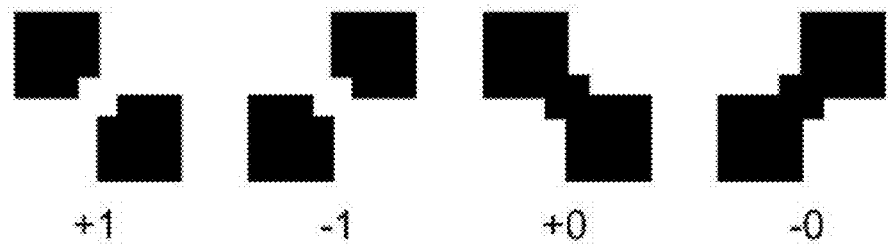

Next, as shown in FIG. 8C, the sign of the primitive 30 is decided to "plus" or "minus", depending on the combination of grids 32 to 35. The patterns of plus and minus may also be reversed.

As shown in FIG. 8D, the primitive 30 may take four values of "+1", "−1", "+0", and "−0", depending on the combinations of the bit 31 and the grids 32 to 35.

Figure 8E:
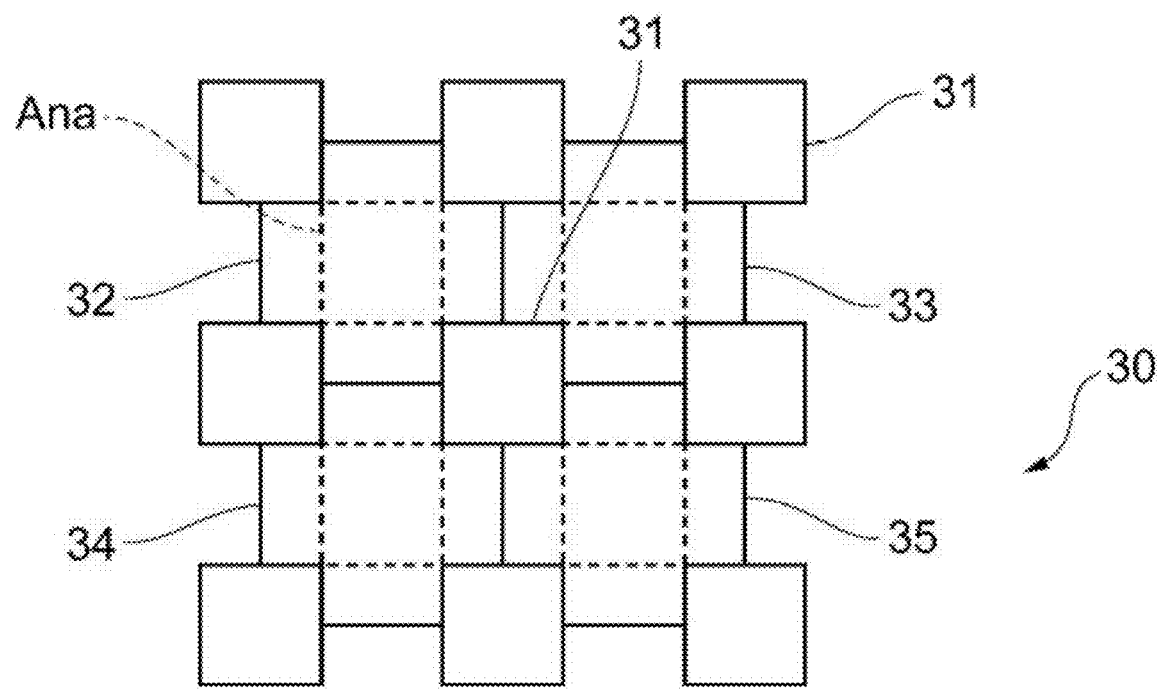

FIG. 8E is a diagram illustrating the rectangular area Ana (see FIG. 5A) that is set to the primitive 30. As shown in FIG. 8E, the bit 31 exists not only at the center of the primitive 30, but also at the surroundings of the primitive 30 (each vertex of the grids 32 to 35). A rectangular area Ana is set inside each of the grids 32 to 35 and does not to overlap the bits 31 (see the regions surrounded by the broken lines in FIG. 8E).

FIG. 9A is a diagram illustrating a "word" constituted by multiple primitives. Here, an example is shown, in which one word is constituted by four rows and four columns of primitives, but the number of primitives constituting one word may be appropriately decided. 3×3 or 2×4 primitives may also be regarded as one word.

FIG. 9B shows some of the primitives included in a word 40. The word 40 includes 5×5 grids. Here, the primitives included in the word 40 can be obtained by shifting the range of 2×2 grids (one primitive) by one grid at a time. Accordingly, as shown in FIG. 9B, the leftmost column of the word 40 includes four primitives 41 to 44. Each row is similarly constituted by four primitives, and thus the word 40 is constituted by 16 primitives. That is, one word is associated with codes constituted by 16 primitives.

<Explanation of Random Pattern Pr>

The random pattern Pr is an aperiodic light and dark pattern, and the binary random pattern Pr is created by irregularly arranging multiple random pieces Prp (see FIG. 5B) each of which is uniquely identifiable (that is, unique). "Irregularly arranging" means that a random arrangement having no regularity and reproducibility, or an arrangement using something like pseudo random numbers may also be used. In an embodiment, the random pattern Pr is projected onto a measurement target, and the measurement target is captured by the stereo camera system including the first camera 210 and the second camera 220. The three-dimensional processing unit 330 of the computer 300 recognizes, as the feature points, the unique random pieces Prp constituting the random pattern Pr that is projected from the projecting unit 100 onto the measurement target, and performs processing (hereinafter, also referred to as "corresponding point searching processing") of searching the same feature point (a pair of corresponding pixels, that is, corresponding points) from the first captured image Img1 and the second captured image Img2 respectively captured by the first camera 210 and the second camera 220.

For the corresponding point searching processing, various types of template matching techniques including SSD (Sum of Squared Difference), SAD (Sum of Absolute Difference), NCC (Normalized Cross-Correlation), and ZNCC (Zero-mean Normalized Cross-Correlation) can be used. The computer 300 specifies the coordinates on the first captured image Img1 and the coordinates on the second captured image Img2 for each feature point by performing the corresponding point searching processing, calculates the position (three-dimensional position) from each camera to the feature point using the principle of stereo measurement from the specifications of the cameras, and acquires the three-dimensional position of each feature point.

[Design Method of Hybrid Pattern]

Figure 10:
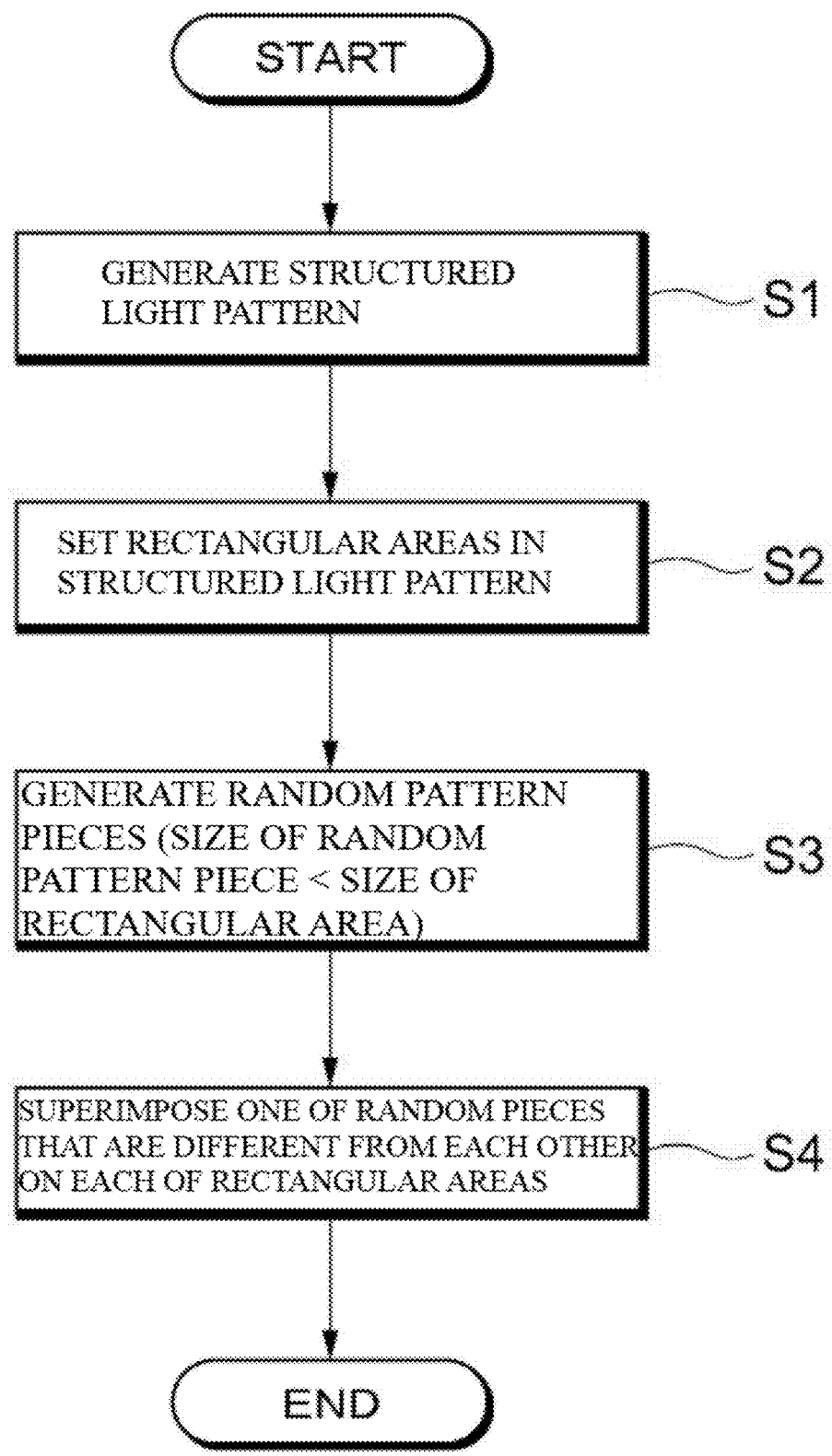
FIG. 10 is a flowchart illustrating a design method of a hybrid pattern.

FIG. 10 is a flowchart showing a design method of the hybrid pattern Ph.

First, the structured light pattern Ps is generated (step S1; see FIG. 8A), which has a word in which the predetermined number of finite types of "primitives" (basic patterns) 30 constituted by light and dark binary values are two-dimensionally arranged.

Next, the rectangular areas Ana are set (step S2; see FIG. 8E) so as not to overlap the bits 31 existing at the center of the primitive 30 and around the primitive 30 (each vertex of the grids 32 to 35).

Then, the random pieces Prp having various shapes are generated (step S3; see FIG. 5B). Note, that the sizes of all the random pieces is designed to fit within the rectangular areas Ana.

Finally, one of the random pieces Prp that are unique and different from each other is superimposed on each rectangular area Ana (step S4; see FIG. 5C).

Note, that each random piece Prp and each rectangular area Ana on which a random piece Prp is superimposed are set to be inverted in black and white with each other.

Figure 11:
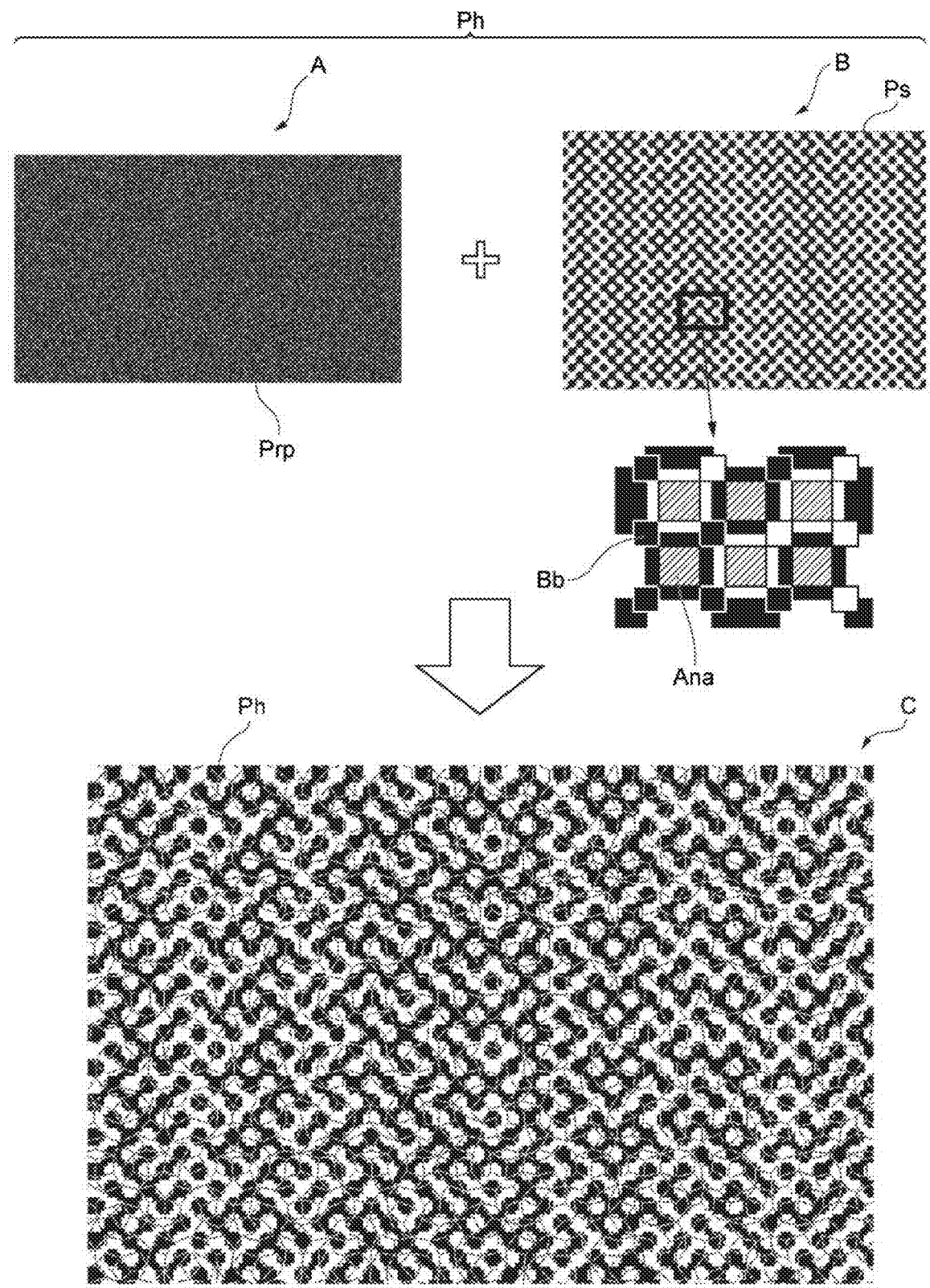
FIG. 11 is a diagram illustrating a design method of another hybrid pattern.

The above design method of the hybrid pattern Ph is merely an example, and various methods can be employed as the design method of the hybrid pattern Ph. FIG. 11 is a diagram illustrating a design method of another hybrid pattern Ph. In the method of the other hybrid pattern Ph, firstly, the random pieces Prp constituted only by random curves (white in color) are generated (see FIG. 11A). Next, the generated random pieces Prp are superimposed on the rectangular areas Ana (see FIG. 11B) that are positioned so as not to overlap the bounding boxes Bb (that is, "bits") constituting the structured light pattern Ps. As a result, the hybrid pattern Ph shown in FIG. 11C is generated.

Note, that each random piece Prp and each rectangular area Ana on which a random piece Prp is superimposed are set to be inverted in black and white with each other. Here, because all random pieces Prp are white, the color of the random pieces Prp is not changed (that is, they remain white) if the random pieces Prp are superimposed on the rectangular areas Ana that are black. However, if the random pieces are superimposed on rectangular areas Ana that are white, the color of the random pieces Prp is changed from white to black.

[Three-Dimensional Measurement Method Using Hybrid Pattern]

Figure 12:
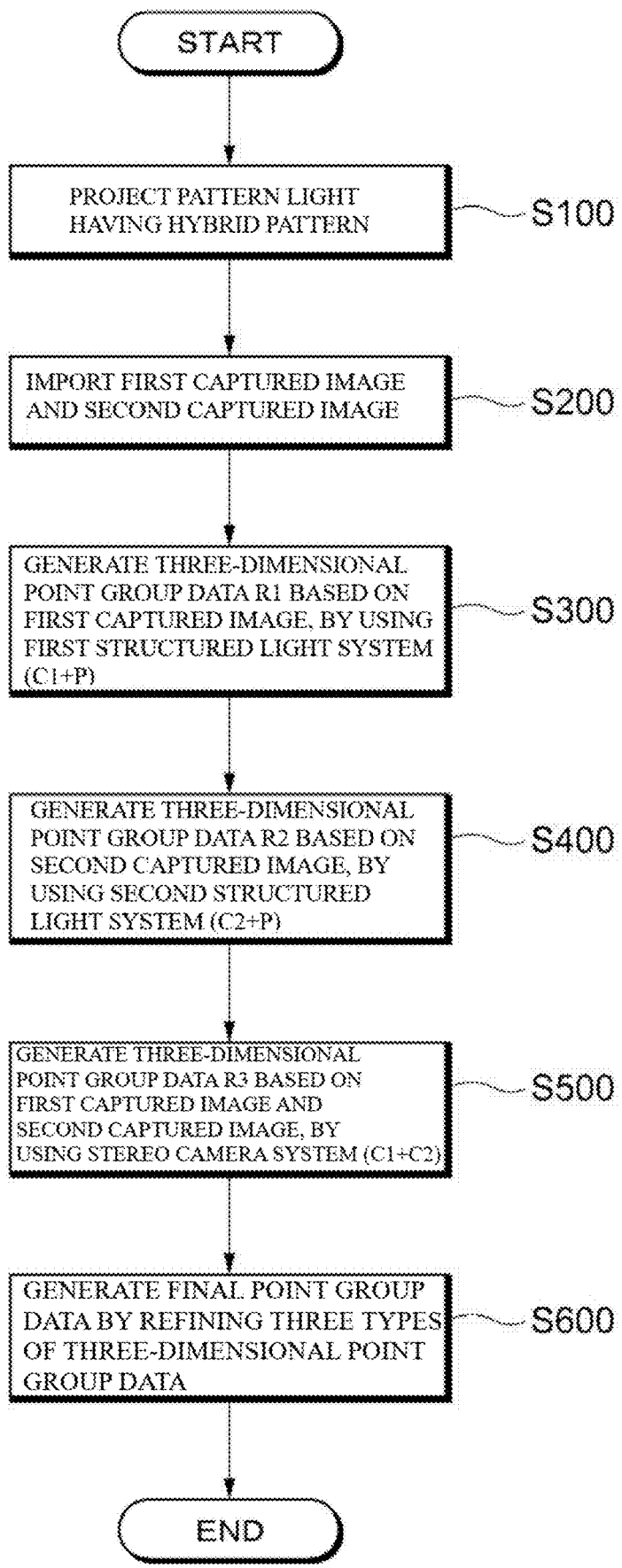
FIG. 12 is a flowchart illustrating processing of three-dimensional measurement using a hybrid pattern executed by a three-dimensional measurement system.

FIG. 12 is a flowchart showing processing of three-dimensional measurement using the hybrid pattern executed by the three-dimensional measurement system 1000.

The control unit 310 controls the projecting unit 100 for projecting patterned light having the hybrid pattern onto a measurement target (step S100). The control unit 310 controls the image capturing unit 200 for capturing the images of the measurement target, onto which the patterned light having the hybrid pattern is projected, using the first camera 210 and the second camera 220. The control unit 310 imports, from the image input unit 320, the first captured image Img1 that is captured by the first camera 210 and the second captured image Img2 that is captured by the second camera 220 (step S200). Here, the patterned light that is projected onto the measurement target and shown in the first captured image Img1 that is captured by the first camera 210 is the same as the patterned light that is projected onto the measurement target and shown in the second captured image Img2 that is captured by the second camera 220.

The three-dimensional processing unit 330 generates three types of three-dimensional point group data shown below, based on the first captured image Img1 and the second captured image Img2 that are supplied from the image input unit 320.

<Generation of Three-Dimensional Point Group Data R1>

The first three-dimensional point group data generation unit 331 generates the three-dimensional point group data R1 based on the first captured image Img1, by using the first structured light system (C1+P) constituted by the projecting unit 100 and the first camera 210 (step S300). Specifically, the first three-dimensional point group data generation unit (the first calculation unit and a first auxiliary calculation unit) 331 selects calculation target pixels of the three-dimensional position of the first captured image Img1. Then, the first three-dimensional point group data generation unit 331 specifies, for each of the selected target pixels, the code of the patterned light (word) shown in that pixel, that is, the column in the pattern (word column), and calculates the three-dimensional position based on the column and the pixel position.

The structured light pattern Ps that is included in the hybrid pattern Ph projected from the projecting unit 100 is stored in the pattern storage unit 334. By comparing the selected calculation target pixel and the structured light pattern Ps stored in the pattern storage unit 334, the first three-dimensional point group data generation unit 331 specifies the column in the structured light pattern Ps from the pattern of the word corresponding to that calculation target pixel. The first three-dimensional point group data generation unit 331 also holds the relationship of the installation positions between the projecting unit 100 and the first camera 210. The first three-dimensional point group data generation unit 331 specifies the column in the structured light pattern Ps (that is, the corresponding point of the patterned light corresponding to the calculation target pixel), and acquires the three-dimensional position of the calculation target pixel (position in the real space) by applying the principle of triangulation to the specified corresponding point of the target pixel x. After the first three-dimensional point group data generation unit 331 has acquired the three-dimensional positions of all the calculation target pixels, the first three-dimensional point group data generation unit 331 generates the three-dimensional point group data R1, and sends the generated three-dimensional point group data R1 to the refining unit 340.

<Generation of Three-Dimensional Point Group Data R2>

The second three-dimensional point group data generation unit 332 generates the three-dimensional point group data R2 based on the second captured image Img2, by using the second structured light system (C2+P) constituted by the projecting unit 100 and the second camera 220 (step S400). Specifically, the second three-dimensional point group data generation unit (the first calculation unit and a second auxiliary calculation unit) 332 selects calculation target pixels of the three-dimensional position of the second captured image Img2. Then, the second three-dimensional point group data generation unit 332 specifies, for each of the selected target pixels, the code of the patterned light (word) shown in that pixel, that is, the column in the pattern (word column), and calculates the three-dimensional position based on the column and the pixel position.

The structured light pattern Ps that is included in the hybrid pattern Ph projected from the projecting unit 100 is stored in the pattern storage unit 334. By comparing the selected calculation target pixel and the structured light pattern Ps stored in the pattern storage unit 334, the second three-dimensional point group data generation unit 332 specifies the column in the structured light pattern Ps from the pattern of the word corresponding to that calculation target pixel. The second three-dimensional point group data generation unit 332 also holds the relationship of the installation positions between the projecting unit 100 and the second camera 220. Accordingly, the second three-dimensional point group data generation unit 332 specifies the column in the structured light pattern Ps (that is, the corresponding point of the patterned light corresponding to the calculation target pixel), and acquires the three-dimensional position of the calculation target pixel (position in the real space) by applying the principle of triangulation to the specified corresponding point of the target pixel x. After the second three-dimensional point group data generation unit 332 has acquired the three-dimensional positions of all the calculation target pixels, the second three-dimensional point group data generation unit 332 generates the three-dimensional point group data R2, and sends the generated three-dimensional point group data R2 to the refining unit 340.

<Generation of Three-Dimensional Point Group Data R3>

The third three-dimensional point group data generation unit 333 generates the three-dimensional point group data R3 based on the first captured image Img1 and the second captured image Img2, by using the stereo camera system (C1+C2) constituted by the first camera 210 and the second camera 220 (step S500). Specifically, the third three-dimensional point group data generation unit (a second calculation unit) 333 recognizes, as the feature point, the unique random piece Prp constituting the random pattern Pr that is projected from the projecting unit 100 onto the measurement target, and performs corresponding point searching processing of searching the same feature point (a pair of corresponding pixels, that is, corresponding points) from the first captured image Img1 and the second captured image Img2 respectively captured by the first camera 210 and the second camera 220.

Specifically, in the corresponding point searching processing (stereo matching), the third three-dimensional point group data generation unit 333 finds, for example, if the first captured image Img1 is regarded as the reference image and the second captured image Img2 is regarded as the comparison image, the feature point corresponding to the feature point of the first captured image Img1 from the second captured image Img2. By performing the same processing for all the feature points, the third three-dimensional point group data generation unit 333 specifies the coordinates of all the same feature points on the first captured image Img1 and the second captured image Img2. Through the corresponding point searching processing, the third three-dimensional point group data generation unit 333 specifies the coordinates in the first captured image Img1 and the second captured image Img2 for each of the feature points, and acquires the three-dimensional position of each feature point (position in the real space) by calculating the position from each camera to the feature point through the principle of stereo measurement. After it has acquired the three-dimensional positions of all the feature points, the third three-dimensional point group data generation unit 333 generates the three-dimensional point group data R3, and sends the generated three-dimensional point group data R3 to the refining unit 340.

The refining unit 340 generates final point group data Rf, by refining the three types of three-dimensional point group data R1 to R3 that are supplied from the three-dimensional processing unit 330 (step S600).

Figure 13:
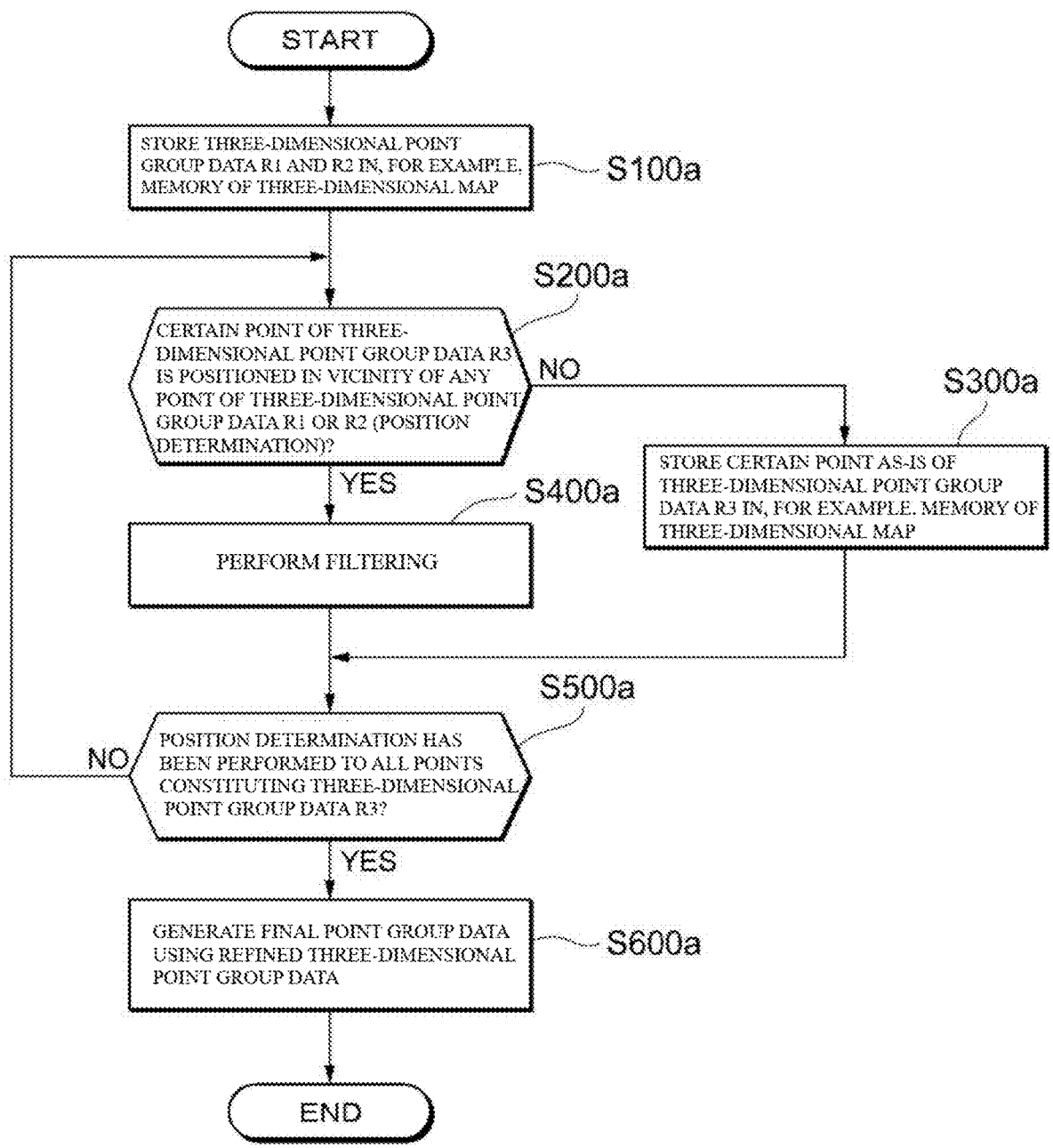
FIG. 13 is a flowchart illustrating refining processing.
Figure 14:
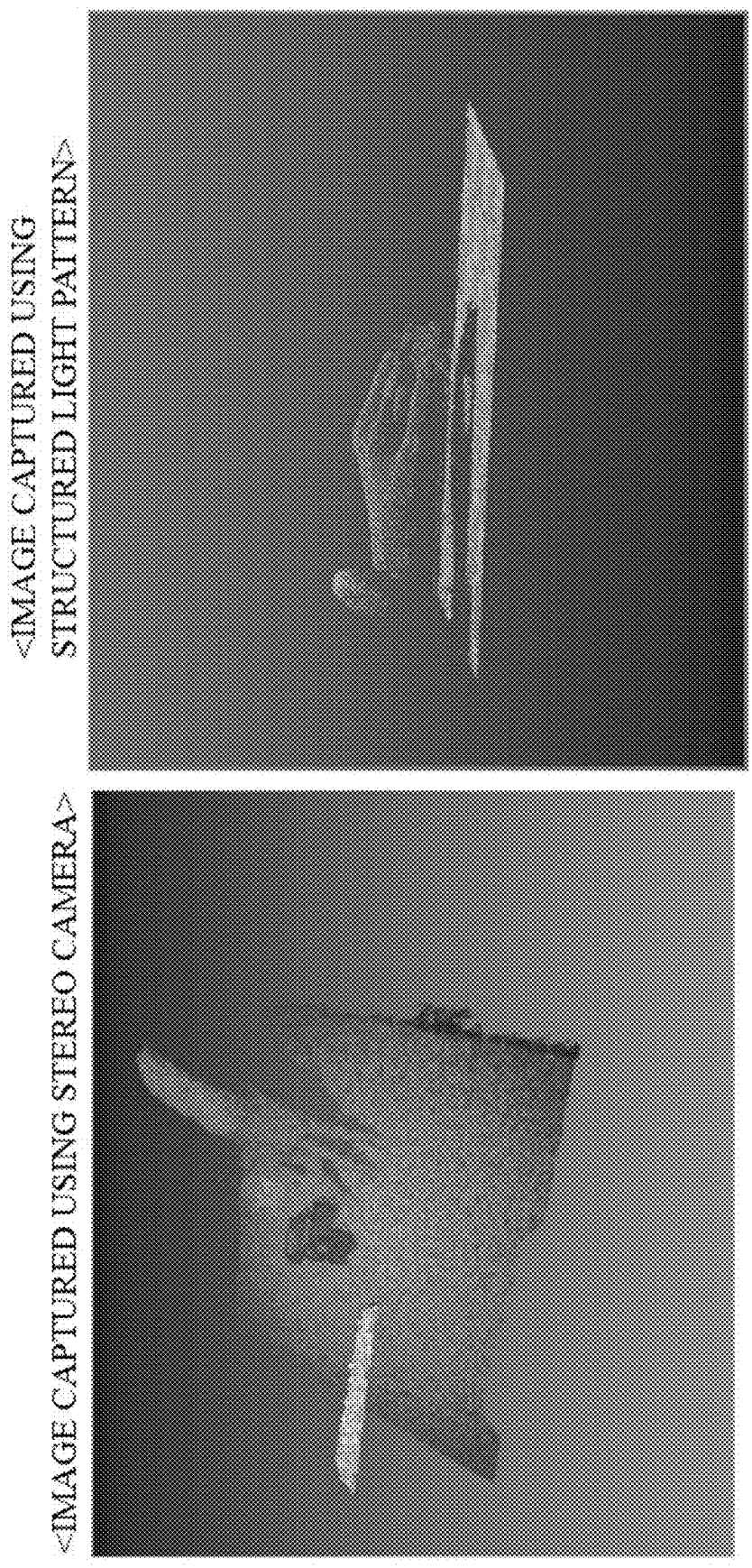
FIG. 14 is a diagram illustrating a comparison example of clarity of images.

FIG. 13 is a flowchart showing refining executed by the refining unit 340. Note, that the refining shown in FIG. 13 is merely an example. The refining method for the three-dimensional point group data R1 to R3 can be changed as appropriate, depending on the shape, size, or the like of a measurement target.

After the refining unit 340 has stored the three-dimensional point group data R1 and R2 in, for example, the memory of three-dimensional map (step S100a), the refining unit 340 determines whether a point Pp constituting the three-dimensional point group data R3 is positioned in the vicinity of a point Pa of one of the three-dimensional point group data R1 and R2 (e.g., whether the distance L1 between the point Pp and the point Pa is shorter than a threshold length Lth) (step S200a; hereinafter also referred to as "position determination").

If the refining unit 340 determines that the point Pp constituting the three-dimensional point group data R3 is not positioned in the vicinity of the point Pa of one of the three-dimensional point group data R1 and R2 because the distance L1 between the point Pp and the point Pa is longer than or equal to the threshold length Lth (NO in step S200a), the refining unit 340 stores the point Pp as-is constituting the three-dimensional point group data R3 in, for example, the memory of the three-dimensional map (step S300a), and moves to step S500a.

The refining unit 340 confirms whether the position determination has been performed for all the points Pp constituting the three-dimensional point group data R3. If the refining unit 340 confirms that the position determination has been performed to all the points Pp constituting the three-dimensional point group data R3 (YES in step S500a), the refining unit 340 generates the final point group data Rf using the refined three-dimensional point group data R1 to R3, and ends the processing.

On the other hand, if the refining unit 340 confirms that there is a point Pp for which the position determination has not been performed (No in step S500a), the refining unit 340 returns to step S200a, and performs the position determination to that point Pp. If the refining unit 340 determines that the point Pp constituting the three-dimensional point group data R3 is positioned in the vicinity of the point Pa of one of the three-dimensional point group data R1 and R2 because the distance L1 between the point Pp and the point Pa is shorter than the threshold distance Lth (YES in step S200a), the refining unit 340 performs the following filtering (step S400a).

That is, the refining unit 340 decreases the weighting to the point Pp and increases the weighting to the point Pa, which is positioned in the vicinity of the point Pp, of one of the three-dimensional point group data R1 and R2, and performs filtering. The refining unit 340 performs filtering, for example, by weighting the point Pp with a first weight and weighting to the point Pa, which is positioned in the vicinity of the point Pp, of one of the three-dimensional point group data R1 and R2 with a second weight that is larger than the first weight. The refining unit 340 moves to step S500a after performing filtering, and confirms whether the position determination has been performed for all the points Pp constituting the three-dimensional point group data R3.

If the refining unit 340 confirms that the position determination has been performed for all the points Pp constituting the three-dimensional point group data R3 (YES in step S500a), the refining unit 340 generates the final point group data Rf using the refined three-dimensional point group data R1 to R3, and ends the processing. On the other hand, if the refining unit 340 confirms that there is the point Pp for which the position determination has not been performed (No in step S500a), the refining unit 340 returns to step S200a, and determines the position of that point Pp. Note, that the operations following this are omitted, because they have already been explained.

As mentioned above, according to an embodiment, a three-dimensional measurement is performed by projecting the patterned light having the hybrid pattern Ph onto a measurement target. Here, the hybrid pattern Ph is a pattern in which the random pattern Pr is superimposed on the structured light pattern Ps, and is arranged such that the random pattern Pr and the structured light pattern Ps do not interfere with each other (e.g., see FIG. 5). In this manner, both advantages of the structured light pattern and the random pattern can be obtained. That is, it is possible to obtain both advantages of the structured light pattern that is excellent in the image clarity and the random pattern that is excellent in the reconstruction ability of the three-dimensional point group data.

B. Other Considerations

In the above embodiments, three-dimensional positions are obtained by targeting only one captured image, but three-dimensional measurement of a moving object may also be performed by performing similar processing with each frame of a moving image as a target.

In the present specification, "unit" does not simply mean a physical structure, and may also include the case in which the processing executed by a "unit" is realized by software. Also, the processing executed by one "unit" or one apparatus may also be realized by two or more physical structures or apparatuses, and the processing executed by two or more physical structures or apparatuses may also be realized by one physical structure or one apparatus.

The above-mentioned step in each processing in the present specification may be modified to be performed in any order or in parallel, to the extent that inconsistencies in terms of contents of processing do not arise.

A program that implements various types of processing described in the present specification may also be stored in a recording medium. With use of this recording medium, the above-mentioned program can be installed in the computer 300. Here, the recording medium in which the above-mentioned program is stored may also be a non-transitory recording medium. The non-transitory recording medium is not limited to a specific medium, and may also be a recording medium such as a CD-ROM, for example.

Additional Remark 1

A three-dimensional measurement apparatus that includes at least one memory and at least one hardware processor connected to the memory, and measures a three-dimensional shape of a measurement target, wherein a predetermined program and a two-dimensionally coded pattern are stored in the memory; and the hardware processor, by executing the predetermined program stored in the memory, executes processing as:

a projecting unit configured to project, onto the measurement target, patterned light having a hybrid pattern in which a two-dimensionally coded pattern, in which a plurality of types of words distinguishable from each other are two-dimensionally arranged, and a random pattern, in which a plurality of random pieces each uniquely identifiable are irregularly arranged, are arranged so as not to cause mutual interference of these patterns;

an image capturing unit including a first camera and a second camera configured to capture the measurement target onto which the patterned light is projected;

a first calculation unit configured to select target pixels from a captured image that is captured by the first camera or the second camera, extract, for each of the selected target pixels, the word of the patterned light that is projected onto that pixel, and acquire a three-dimensional position of each of the target pixels based on the extracted word and the two-dimensionally coded pattern stored in the pattern storage unit; and a second calculation unit configured to, if one of the captured images that are captured by the first camera and the second camera is regarded as a reference image and the other captured image is regarded as a comparison image, extract feature points respectively corresponding to the random pieces from the reference image, perform stereo matching with respect to the comparison image using each of the extracted feature points, and determine a three-dimensional position of each of the feature points based on a stereo matching result.

Additional Remark 2

A three-dimensional measurement method for measuring a three-dimensional shape of a measurement target, using at least one hardware processor, wherein the hardware processor executes:

a projection step of projecting, onto a measurement target, patterned light having a hybrid pattern in which a two-dimensionally coded pattern, in which a plurality of types of words distinguishable from each other are two-dimensionally arranged, and a random pattern, in which a plurality of random pieces each uniquely identifiable are irregularly arranged, are arranged so as not to cause mutual interference of these patterns;

an image capture step of capturing the measurement target onto which the patterned light is projected using an image capturing unit including a first camera and a second camera;

a first calculation step of selecting target pixels from a captured image that is captured by the first camera or the second camera, extracting, for each of the selected target pixels, the word of the patterned light that is projected onto that pixel, and determining a three-dimensional position of each of the target pixels based on the extracted word and a two-dimensionally coded pattern stored in a storage unit; and a second calculation step of, if one of the captured images that are captured by the first camera and the second camera is regarded as a reference image and the other captured image is regarded as a comparison image, extracting feature points respectively corresponding to the random pieces from the reference image, performing stereo matching with respect to the comparison image using each of the extracted feature points, and determining a three-dimensional position of each of the feature points based on a stereo matching result.

The invention claimed is:

1. A three-dimensional measurement apparatus for measuring a three-dimensional shape of a measurement target, the apparatus comprising:

a projector projecting, onto a measurement target, patterned light in which a two-dimensionally coded pattern comprising a plurality of types of words distinguishable from each other are two-dimensionally arranged, and a random pattern comprising a plurality of random pieces each uniquely identifiable are irregularly arranged, the two-dimensionally coded pattern and the random pattern arranged so as not to cause mutual interference;

an image capturing unit comprising a first camera and a second camera capturing a plurality of images of the measurement target onto which the patterned light is projected;

a memory storing the two-dimensionally coded pattern;

a processor configured with a program to perform operations comprising:

operation as a first calculation unit configured to:

select target pixels from the one or more images, extract, for each of the selected target pixels, the word of the patterned light projected onto that pixel, and acquire a three-dimensional position of each of the target pixels based on the extracted word and the two-dimensionally coded pattern stored in the memory; and operation as a second calculation unit configured to, in response to one of the plurality of captured images captured being regarded as a reference image and a different one of the plurality of captured images being regarded as a comparison image:

extract feature points respectively corresponding to the random pieces from the reference image, perform stereo matching with respect to the comparison image using each of the extracted feature points, and determine a three-dimensional position of each of the feature points based on a stereo matching result.

2. The three-dimensional measurement apparatus according to claim 1, wherein the patterned light projected from the projector onto the measurement target when one of the captured images is captured by the first camera and the patterned light projected from the projecting unit onto the measurement target when one of the captured images is captured by the second camera are the same.

3. The three-dimensional measurement apparatus according to claim 1, wherein a plurality of rectangular areas on which the plurality of random pieces are respectively superimposed are provided in the two-dimensionally coded pattern, and the size of each of the random pieces is set to be smaller than that of each of the rectangular areas.

4. The three-dimensional measurement apparatus according to claim 1, wherein a distance from the first camera to the projector and a distance from the second camera to the projector are different.

5. The three-dimensional measurement apparatus according to claim 1, wherein:
the processor is configured with the program to perform operations such that:
operation as the first calculation unit comprises operation as the first calculation unit generating three-dimensional point group data that represents the three-dimensional position of the target pixels;
operation as the second calculation unit comprises operation as the second calculation unit generating three-dimensional point group data that represents the three-dimensional position of the feature points; and
the processor is configured with the program to perform operations further comprising operation as a refining unit configured to generate final point group data by refining the three-dimensional point group data generated by the first calculation unit and the three-dimensional point group data generated by the second calculation unit.

6. The three-dimensional measurement apparatus according to claim 5, wherein
the processor is configured with the program to perform operations such that operation as the refining unit comprises operation as the refining unit configured to perform the refining through filtering by, in response to determining that a point constituting the three-dimensional point group data calculated by the second calculation unit is positioned in the vicinity of any point constituting the three-dimensional point group data calculated by the first calculation unit, weighting the point constituting the three-dimensional point group data calculated by the second calculation unit with a first weight, and by weighting any point constituting the three-dimensional point group data calculated by the first calculation unit with a second weight that is larger than the first weight.

7. The three-dimensional measurement apparatus according to claim 1, wherein the processor is configured with the program to perform operations such that operation as the first calculation unit comprises:
operation as a first auxiliary calculation unit configured to select target pixels from one of the captured images captured by the first camera, to extract, for each of the selected target pixels, the word of the patterned light projected onto that pixel, and to acquire a three-dimensional position of each of the target pixels based on the extracted word and the two-dimensionally coded pattern stored in the memory; and
operation as a second auxiliary calculation unit configured to select target pixels from one of the captured images captured by the second camera, to extract, for each of the selected target pixels, the word of the patterned light projected onto that pixel, and to determine a three-dimensional position of each of the target pixels based on the extracted word and the two-dimensionally coded pattern stored in the memory.

8. The three-dimensional measurement apparatus according to claim 2, wherein a plurality of rectangular areas on which the plurality of random pieces are respectively superimposed is provided in the two-dimensionally coded pattern, and the size of each of the plurality of random pieces is set to be smaller than that of each of the plurality of rectangular areas.

9. The three-dimensional measurement apparatus according to claim 2, wherein a distance from the first camera to the projector and a distance from the second camera to the projector are different.

10. The three-dimensional measurement apparatus according to claim 3, wherein a distance from the first camera to the projector and a distance from the second camera to the projector are different.

11. The three-dimensional measurement apparatus according to claim 2, wherein the processor is configured with the program such that operation as the first calculation unit comprises:
operation as a first auxiliary calculation unit configured to select target pixels from one of the captured images captured by the first camera, to extract, for each of the selected target pixels, the word of the patterned light projected onto that pixel, and to acquire a three-dimensional position of each of the target pixels based on the extracted word and the two-dimensionally coded pattern stored in the memory; and
operation as a second auxiliary calculation unit configured to select target pixels from one of the captured images captured by the second camera, to extract, for each of the selected target pixels, the word of the patterned light projected onto that pixel, and to determine a three-dimensional position of each of the target pixels based on the extracted word and the two-dimensionally coded pattern stored in the memory.

12. The three-dimensional measurement apparatus according to claim 3, wherein the processor is configured with the program such that operation as the first calculation unit comprises:
operation as a first auxiliary calculation unit configured to select target pixels from one of the captured images captured by the first camera, to extract, for each of the selected target pixels, the word of the patterned light projected onto that pixel, and to acquire a three-dimensional position of each of the target pixels based on the extracted word and the two-dimensionally coded pattern stored in the memory; and
operation as a second auxiliary calculation unit configured to select target pixels from one of the captured images captured by the second camera, to extract, for each of the selected target pixels, the word of the patterned light projected onto that pixel, and to determine a three-dimensional position of each of the target pixels based on the extracted word and the two-dimensionally coded pattern stored in the memory.

13. A three-dimensional measurement method for measuring a three-dimensional shape of a measurement target, the method comprising:
projecting, onto a measurement target, patterned light having a hybrid pattern in which a two-dimensionally coded pattern comprising a plurality of types of words distinguishable from each other are two-dimensionally arranged, and a random pattern comprising a plurality of random pieces each uniquely identifiable are irregularly arranged, the two-dimensionally coded pattern and the random pattern arranged so as not to cause mutual interference;
capturing a plurality of images of the measurement target onto which the patterned light is projected using an image capturing unit including a first camera and a second camera;

selecting target pixels from one or more of the captured images captured by the first camera or the second camera, extracting, for each of the selected target pixels, the word of the patterned light that is projected onto that pixel, and determining a three-dimensional position of each of the target pixels based on the extracted word and the two-dimensionally coded pattern stored in a memory; and extracting, in response to one of the captured images captured by the first camera and the second camera being regarded as a reference image and a different one of the captured images being regarded as a comparison image, feature points respectively corresponding to the random pieces from the reference image, performing stereo matching with respect to the comparison image using each of the extracted feature points, and determining a three-dimensional position of each of the feature points based on a stereo matching result.

14. A non-transitory computer-readable recording medium storing a program for causing a computer comprising a memory storing a two-dimensionally coded pattern and an image capturing unit comprising a first camera and a second camera to measure a three-dimensional shape of a measurement target, the program, when read and executed, causing the computer to perform operations comprising:

projecting, onto a measurement target, patterned light having a hybrid pattern in which a two-dimensionally coded pattern comprising a plurality of types of words distinguishable from each other are two-dimensionally arranged, and a random pattern comprising a plurality of random pieces each uniquely identifiable are irregularly arranged, the two-dimensionally coded pattern and the random pattern arranged so as not to cause mutual interference;

capturing a plurality of images of the measurement target onto which the patterned light is projected using the image capturing unit;

selecting target pixels from one or more of the captured images captured by the first camera or the second camera, extracting, for each of the selected target pixels, the word of the patterned light projected onto that pixel, and determining a three-dimensional position of each of the target pixels based on the extracted word and the two-dimensionally coded pattern stored in the memory; and extracting, in response to one of the captured images captured by the first camera and the second camera being regarded as a reference image and a different one of the captured images being regarded as a comparison image, feature points respectively corresponding to the random pieces from the reference image, performing stereo matching with respect to the comparison image using each of the extracted feature points, and determining a three-dimensional position of each of the feature points based on a stereo matching result.

* * * * *